(12) United States Patent
Birkenes et al.

(10) Patent No.: US 9,451,414 B1
(45) Date of Patent: Sep. 20, 2016

(54) AUTOMATICALLY DETERMINING RELATIVE LOCATIONS OF COLLABORATION ENDPOINTS WITHIN A BUILDING

(71) Applicant: Cisco Technology, Inc., San Jose, CA (US)

(72) Inventors: Oystein Birkenes, Oslo (NO); Bjorn Winsvold, Tranby (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/861,382

(22) Filed: Sep. 22, 2015

(51) Int. Cl.
*H04W 4/04* (2009.01)
*G06Q 10/10* (2012.01)

(52) U.S. Cl.
CPC ......... *H04W 4/043* (2013.01); *G06Q 10/1095* (2013.01)

(58) Field of Classification Search
CPC ... H04W 88/00; H04W 88/02; H04W 88/08; H04W 88/10; H04W 16/20; H04W 48/00; H04W 4/02; H04W 4/023; H04W 64/00; H04W 4/021; H04W 4/026; H04W 4/04; H04W 4/028; H04W 4/043; G01C 21/206; G01C 21/00; G01C 21/20; G01C 21/34; G01C 21/28
See application file for complete search history.

(56) References Cited

U.S. PATENT DOCUMENTS

| | | | |
|---|---|---|---|
| 7,162,368 B2 | 1/2007 | Levi et al. | |
| 8,332,137 B2 * | 12/2012 | Venkatraman | G01C 5/06 701/408 |
| 8,934,884 B2 | 1/2015 | Gustafsson et al. | |
| 9,234,965 B2 * | 1/2016 | Venkatraman | G01S 19/48 |
| 2010/0004005 A1 * | 1/2010 | Pereira | H04W 4/02 455/457 |
| 2013/0133421 A1 | 5/2013 | Katz | |
| 2013/0293416 A1 | 11/2013 | Waters et al. | |
| 2014/0164629 A1 | 6/2014 | Barth et al. | |
| 2015/0330780 A1 * | 11/2015 | Yuzawa | G01C 5/06 702/150 |

OTHER PUBLICATIONS

Liu et al., "Beyond Horizontal Location Context: Measuring Elevation Using Smartphone's Barometer", UBICOMP '14 Adjunct, Sep. 13-17, 2014, Seattle, WA, USA, pp. 459-468.
Li et al., "Using Barometers to Determine the Height for Indoor Positioning", International Global Navigation Satellite Systems Society, IGNSS Symposium 2013, Outrigger Gold Coast, Australia, Jul. 16-18, 2013, 12 pages.

(Continued)

*Primary Examiner* — Meless Zewdu
(74) *Attorney, Agent, or Firm* — Edell, Shapiro & Finnan, LLC

(57) ABSTRACT

Techniques are presented herein for a server to automatically determine the locations of collaboration endpoints and user devices throughout a building, and then provide the user devices with directions to the endpoints. The server collects air pressure and GPS readings from the user devices over a period of time. The readings may be collected from user devices that are paired or unpaired with endpoints at the time of the readings. Over a period of time, the plurality of readings may be used by the server to calculate user device offsets, endpoint offsets, floor level offsets, and endpoint relative orientations within the building. The server may then, in response to a notification of an upcoming meeting, provide the user device with directions to the meeting based on the collected readings.

20 Claims, 21 Drawing Sheets

(56) References Cited

OTHER PUBLICATIONS

Xia et al., "Using Multiple Barometers to Detect the Floor Location of Smart Phones with Built-in Barometric Sensors for Indoor Positioning", Mar. 31, 2015, Sensors 2015, 15, doi: 10.3390/s150407857, Open Access, Sensors, ISSN 1424-8220, www.mdpi.com/journal/sensors, pp. 7857-7877.

"Microsoft Indoor Localization Competition—IPSN 2015", Microsoft Research, http://research.microsoft.com/en-us/events/indoorloccompetition2015/, Apr. 13-17, 2015, Seattle, WA, USA, 5 pages.

"MazeMap", MazeMap Indoor Maps and Navigation, http://www.mazemap.com (last visited on Sep. 22, 2015).

"Microsoft Indoor Localization Competition—ISPN 2014", Microsoft Research, http://research.microsoft.com/un-us/events/ipsn2014indoorlocalizatinocompetition/default.aspx, Apr. 15-17, 2014, Berlin, Germany, 5 pages.

"Indoor positioning system", From Wikipedia, the free encyclopedia, https://en.wikipedia.org/wiki/Indoor_positioning_system (last visited on Sep. 22, 2015).

"Indoor Navigation & Indoor Positioning by insoft", http://www.insoft.com, (last visited on Sep. 22, 2015).

"Anyplace: A free and open Indoor Navigation Service with superb accuracy!", Anyplace, Indoor Information Service, http://anyplace.cs.ucy.ac.cy/, (last visited on Sep. 22, 2015).

* cited by examiner

900

| TIME | ENDPOINT | DEVICE | PRESSURE (hPa) |
|---|---|---|---|
| 12:44 | EDISON | A | 998.9 |
| 12:44 | - | B | 998.3 |
| 12:44 | - | C | 997.6 |
| 12:45 | NERDSNEST | A | 998.1 |
| 12:45 | - | B | 998.3 |
| 12:45 | - | C | 997.6 |
| 12:46 | NERDSNEST | A | 998.1 |
| 12:46 | NERDSNEST | B | 997.9 |
| 12:46 | - | C | 997.6 |
| 12:47 | TANGRAM | A | 998.9 |
| 12:47 | EDISON | C | 998.8 |
| 12:48 | TANGRAM | A | 998.9 |
| 12:48 | TOTT | C | 999.3 |
| 12:49 | TANGRAM | A | 998.9 |
| 12:49 | - | C | 999.3 |

FIG.12

|   | A | B | C | D |
|---|---|---|---|---|
| A | . | . | . | . |
| B | 0.2 | . | . | . |
| C | 0.1 | -0.1 | . | . |
| D | . | . | . | . |

| |
|---|
| 0.0 |
| 0.8 |
| 0.8 |
| 0.8 |
| 0.4 |
| 0.4 |
| 0.0 |
| 0.0 |
| 1.2 |
| 1.2 |
| 1.2 |
| 0.0 |
| -0.5 |
| 0.0 |
| -0.5 |

| ENDPOINT | RELATIVE ORIENTATION |
|----------|----------------------|
| NERDSNEST | EAST |
| TANGRAM | NORTH |
| EDISON | SOUTH |
| TOTT | CENTRAL |

FIG.18

AUTOMATICALLY DETERMINING RELATIVE LOCATIONS OF COLLABORATION ENDPOINTS WITHIN A BUILDING

TECHNICAL FIELD

The present disclosure relates to determining locations of user devices and collaboration endpoints within a building.

BACKGROUND

Collaboration sessions often occur when user devices are gathered around a collaboration endpoint. A user may be able to pair their user device with the collaboration endpoint automatically to receive or send data for the collaboration session. Furthermore, a user can use his/her user device as a remote control for the collaboration session or see the shared presentation from the collaboration endpoint on the display screen of the user device.

It is difficult for users to find the proper meeting room and/or collaboration endpoint within buildings, especially in buildings having a large number of meeting rooms and collaboration endpoints. Furthermore, the naming conventions of meeting rooms within buildings are cumbersome and do not easily convey to the users the location of the meeting rooms within the building. Some buildings may provide a map of meeting rooms with information about their floor levels and perhaps their orientation, but these maps are often difficult to read and comprehend.

BRIEF DESCRIPTION OF THE DRAWINGS

FIG. 12 is a table depicting in more detail air pressure readings from user devices at different times and locations of the user devices, according to an example embodiment.

FIG. 14 is a table depicting in more detail the air pressure offsets for the user devices, according to an example embodiment.

FIG. 15 is a table depicting in more detail the pressure differentials to the reference floor, according to an example embodiment.

FIG. 18 is a table depicting in more detail the relative orientation of the collaboration endpoints, according to an example embodiment.

DESCRIPTION OF EXAMPLE EMBODIMENTS

Overview

Figure 1:
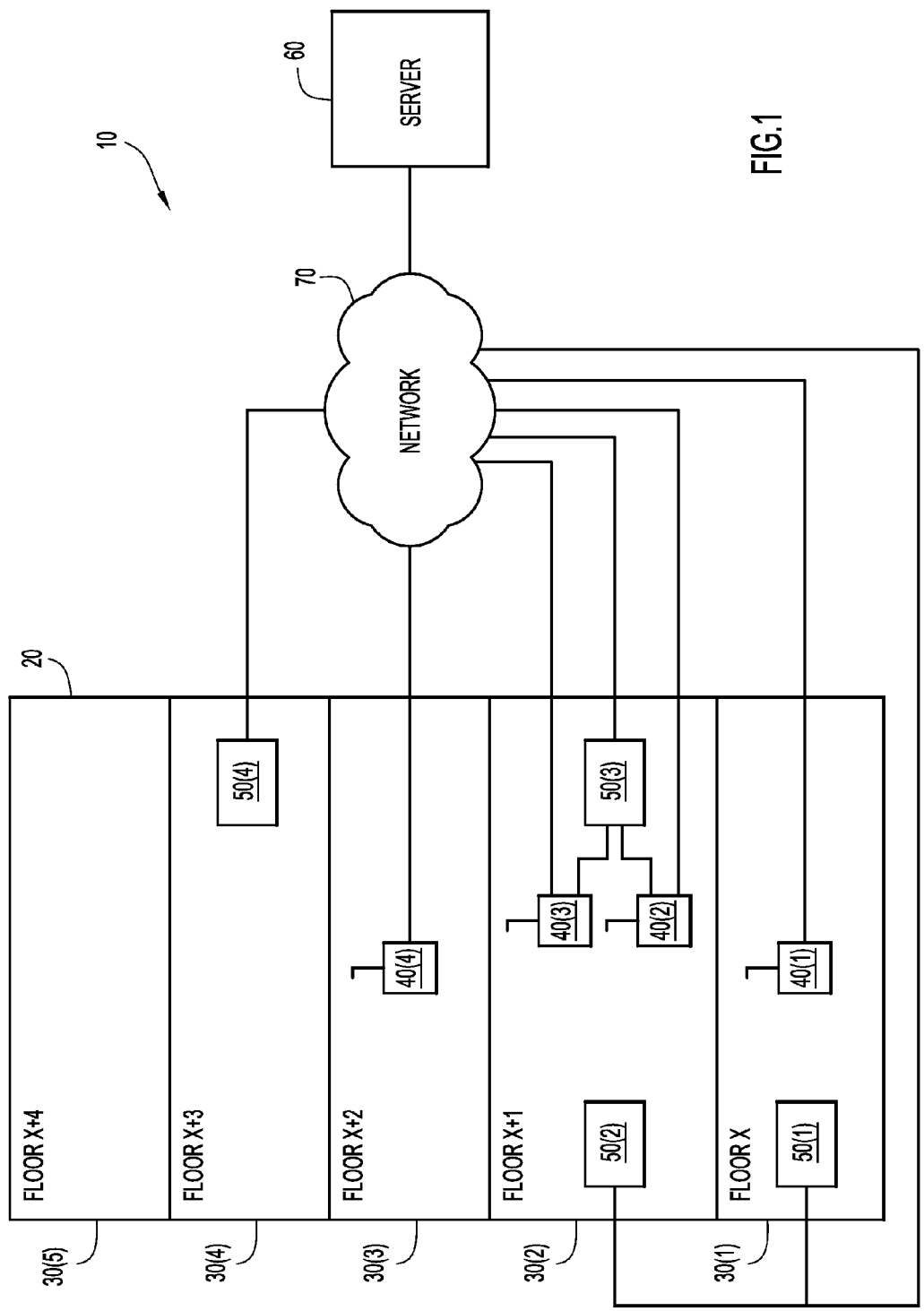
FIG. 1 is a block diagram of an environment for determining relative locations of collaboration endpoints within a building, according to an example embodiment.

Techniques are presented herein to provide to user devices directions within a building to a meeting location within the building. A building may contain a plurality of user devices disposed throughout the building at various locations and on various floors. Moreover, the building may contain a plurality of collaboration endpoints disposed on multiple floors throughout the building. Many collaboration endpoints are personal endpoints and may be located in various rooms (e.g., a personal office, a meeting room, etc.) throughout the building. The user devices may be configured to connect or pair to a collaboration endpoint when the user devices are on the same floor and in proximity to a collaboration endpoint.

A server collects air pressure measurements/readings obtained from a plurality of user devices located within a building over a period of time. Each of the user devices may be paired with a collaboration endpoint at the time the air pressure measurements are made. The server then assigns each air pressure reading a user device identification, a time of the air pressure reading, and, if the user device is paired with a collaboration endpoint at the time of the air pressure reading, an identifier of the collaboration endpoint. From the plurality of air pressure readings, the server then calculates a first set of offsets. The first set of offsets represents the difference in air pressure readings between user devices. For example, if two user devices are paired with the same collaboration endpoint, then these user devices may provide different air pressure readings despite being on the same floor level. The difference in air pressure readings between these two user devices will serve as the offset between these two user devices. The server also calculates a second set of offsets from the collected air pressure readings. The second set of offsets represents the difference in height between collaboration endpoints. As elevation increases, air pressure decreases. Thus, air pressure readings from user devices connected to a first collaboration endpoint may be less than air pressure readings from user devices connected to a second collaboration endpoint. It can then be determined that the first collaboration endpoint is on a higher floor level than the second collaboration endpoint. Once the first set of offsets and second set of offsets have been calculated, and once all of the air pressure readings have been collected, the server may determine floor level pressure differentials based on the air pressure readings, first set of offsets, and second set of offsets. The server may then receive notification of a meeting from at least one user device. The meeting notification may provide a meeting location proximate to at least one of the plurality of collaboration endpoints. Finally, the server may send the air pressure readings, first set of offsets, second set of offsets, and floor level pressure differentials to the user device so that the user device may calculate the directions based on the information received by the server in addition to the user device's own air pressure reading. The directions are calculated from at least two air pressure readings (i.e., one reference air pressure reading from a known floor level and one air pressure reading from the user device), the first set of offsets, the second set of offsets, and the floor level differentials.

In addition, over a period of time, the server collects GPS measurements/readings obtained from a plurality of user devices that are paired with a collaboration endpoint within a building. The server may assign each of the GPS readings a collaboration endpoint, and may store the plurality of GPS readings in a database. By collecting enough GPS readings of user devices paired with collaborations endpoints, the relative location of the collaboration endpoints within the building may be determined.

Example Embodiments

A common problem for users in a building is to locate a meeting room for a meeting, but the users do not know the location of the meeting room or how to get to the meeting room. Some buildings use a naming convention for meeting rooms, for example, names that include floor level and orientation. However, naming conventions can get cumbersome due to all the details encoded in the room name, and as a result, meeting room names are not easy to understand for users that are not familiar with the convention. Other buildings provide a list of meeting rooms with information about their floor levels and perhaps their orientation. Such a list needs to be manually maintained by a building administrator and made available for the users of the building.

However, with currently available collaboration technology, a user can pair his/her user device with a collaboration endpoint for an increased user experience. For example, a user can use his/her user device as a remote control for the collaboration system or see the shared presentation from the collaboration endpoint on the screen of the user device. Pairing or connecting a user device with a nearby collaboration endpoint can happen automatically. This would allow for easy transfer of data between user devices and collaboration endpoints. In addition, when the user devices are equipped with sensors, such as global positioning system (GPS) sensors and air pressure sensors, the collaboration endpoints will then frequently obtain access to sensor readings/measurements from the user devices, such as GPS information and air pressure information. The information collected from the user devices may be utilized to create an approximate location map (or fuzzy location map) of all the collaboration endpoints and user devices within a building. The approximate location map may be a map of relative locations that has precise floor level differences, but may only be approximate planar locations or relative orientations. The term "map" is used to represent the collective information of the locations of the collaboration endpoints and user devices throughout a building. The approximate location map is created and established from the gathered air pressure readings, GPS readings, and identification of user devices paired with collaboration endpoints via proximity pairing technology. In addition to, or instead of, GPS, inertial sensors from the user devices may be used for the creation of the approximate location map. If a building or customer contains an indoor positioning system, the indoor positioning system may also be used for the creation of the approximate location map.

Air pressure, which can be thought of as the weight of the atmosphere above, varies with space, time, and the weather. However, within a confined space, such as a building, the air pressure at a given height is approximately constant and typically varies very little over time. Air pressure decreases with altitude or elevation. Thus, at any given time, a floor level will have a smaller air pressure than another floor level that is lower. Temperature and humidity also affect the air pressure, but, for typical office buildings, the temperature and the humidity do not fluctuate as they do in the environment outside of the building. In addition, the effects of temperature and humidity are relatively small when compared with the air pressure changes caused by the altitude differences between floors.

Many user devices, in particular the latest generation of mobile phones, have a built-in digital barometer or air pressure sensor. These air pressure sensors are often inaccurate when measuring the absolute air pressure (roughly+/−1 hPa for the barometer, which corresponds to about +/−8 meters), but the relative air pressure measurements that are described herein are much more accurate (roughly+/−0.12 hPa for the barometer, which corresponds to about +/−1 meter). It should be noted that the relative accuracy can be further improved with post-processing techniques such as time averaging. Put differently, each air pressure sensor may have a large bias, but typically a small variance. Therefore, when comparing air pressure readings from two different devices it is important to take into account their difference in bias.

In addition, most user devices also include a built-in GPS sensor. A GPS sensor is most often used to find the location of the device in an outdoor environment, where the accuracy of the readings from the GPS sensor is about 15 meters. However, inside a building, the readings from a GPS sensor are less accurate mainly due to their signals being attenuated and scattered by roofs, walls and other objects. Using a GPS sensor to detect floor levels inside a building does not work due to the poor accuracy. However, averaging many GPS position measurements over time and across different devices may, in many cases, provide an approximate planar location that may be used to provide relative orientations and locations.

Figure 2:
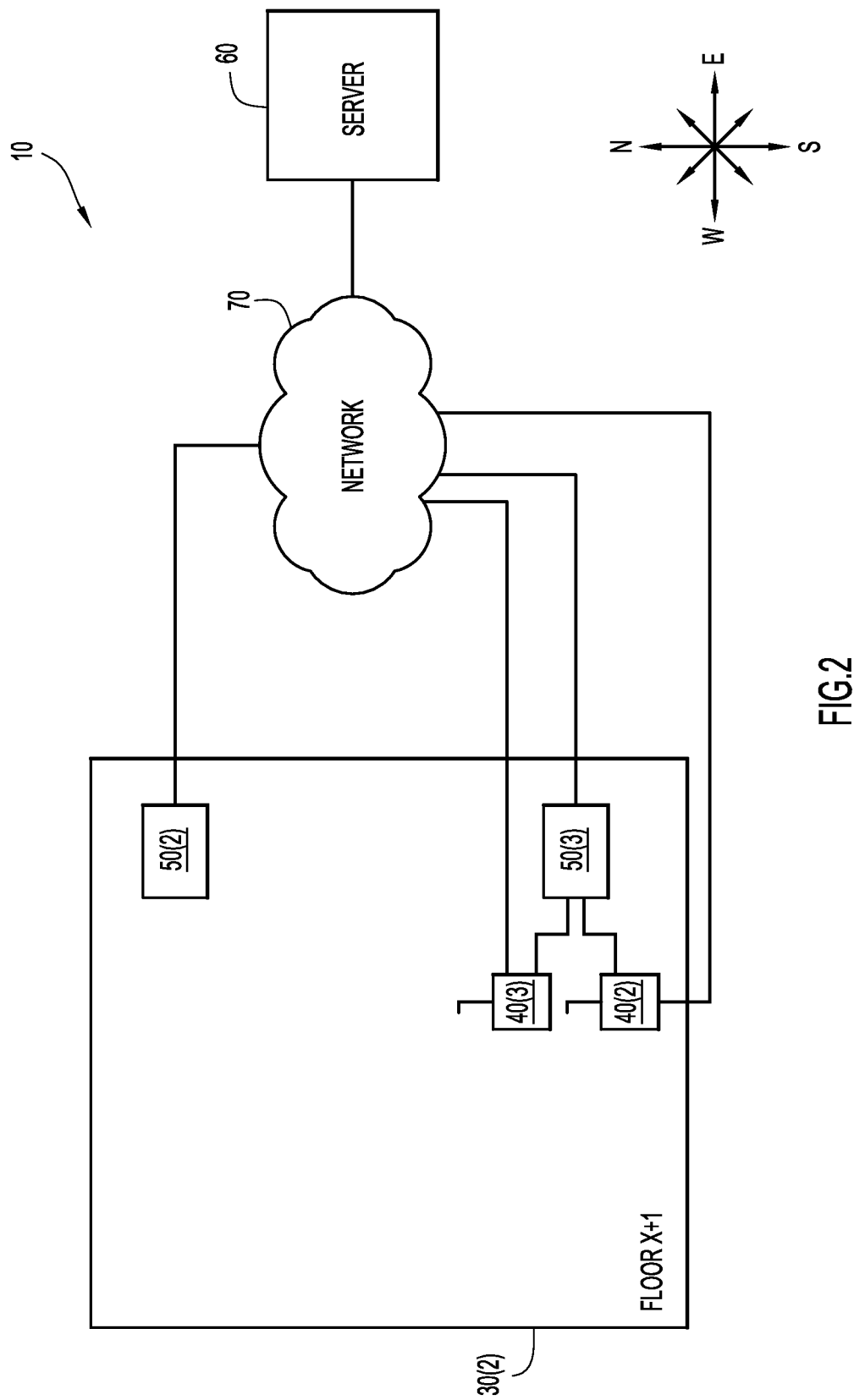
FIG. 2 is a block diagram of the environment illustrated in FIG. 1, wherein the block diagram is a top view of Floor X+1 in the building.

An example embodiment of a location determination system 10 configured to determine the floors and positioning on the floors of collaboration endpoints and user devices is depicted in FIGS. 1 and 2. FIG. 1 illustrates a block diagram depicting an elevation view of the location determination system 10, while FIG. 2 illustrates a view of a given floor in the location determination system 10. The location determination system 10 is a system that operates with respect to a building 20 containing multiple floor levels 30(1)-30(5). The building 20 may house, permanently or temporarily, a plurality of user devices 40(1)-40(4) and a plurality of collaboration endpoints 50(1)-50(4). As illustrated, the user devices 40(1)-40(4) are located throughout the building 20. User device 40(1) is located on the floor level 30(1). User devices 40(2), 40(3) are located on floor level 30(2). User device 40(4) is located on floor level 30(3). Similarly, the collaboration endpoints 50(1)-50(4) are located throughout the building 20. As illustrated, collaboration endpoint 50(1) is located on floor level 30(1). In addition, collaboration endpoints 50(2), 50(3) are located on floor level 30(2). Collaboration endpoint 50(4) is located on floor level 30(4). Collaboration endpoints 50(1)-50(4) may be located in meeting rooms or meeting locations within the building 20. As further illustrated, the user devices 40(1)-40(4) may be capable of connecting or pairing with the collaboration endpoints 50(1)-50(4) when the user devices 40(1)-40(4) are located on the same floor level 30(1)-30(5) and in proximity to the collaboration endpoints 50(1)-50(4). Thus, as illustrated, user device 40(1) and collaboration endpoint 50(1) are both located on floor level 30(1), and user device 40(1) is paired with collaboration endpoint 50(1). Moreover, user devices 40(2), 40(3) and collaboration endpoints 50(2), 50(3) are located on floor level 30(2), but both user devices 40(2), 40(3) are only paired with collaboration endpoint 50(3). User device 40(4) is located on floor level 30(3), but no other user devices or collaboration endpoints are located on floor level 30(3). Thus, the user device 40(4) is not paired with a collaboration endpoint, as illustrated in FIG. 1. Furthermore, collaboration endpoint 50(4) is located on floor level 30(4), but is not paired with any user devices because there are no user devices located on floor level 30(4).

As further illustrated in FIGS. 1 and 2, the user device 40(1)-40(4) and the collaboration endpoints 50(1)-50(4) are connected to a server 60 via a network 70. The connection of the server 60 with both the user devices 40(1)-40(4) and the collaboration endpoints 50(1)-50(4) enables data to be sent to and from the server 60, the user devices 40(1)-40(4), and the collaboration endpoints 50(1)-50(4). The user devices 40(1)-40(4) may be connected to the server 60 when paired and when unpaired with the collaboration endpoints 50(1)-50(4). As best illustrated in FIG. 2, the user devices 40(1)-40(4) may be paired or connected with collaboration endpoints 50(1)-50(4) via proximity pairing capabilities, such as ultrasonic proximity pairing. Generally, user devices 40(1)-40(4) may only be paired with collaboration endpoints 50(1)-50(4) that are located on the same floor levels 30(1)-30(5) as each other. As best illustrated in FIG. 2, user devices 40(2), 40(3) and collaboration endpoints 50(2), 50(3) are located on floor level 30(2). Collaboration endpoint 50(2) is located at the northeast corner of floor level 30(2) of the building 20. Collaboration endpoint 50(3), however, is located at the southeast corner of floor level 30(2) of the building 20. Moreover, user devices 40(3), 40(4) are located in closer proximity to collaboration endpoint 50(3) than to collaboration endpoint 50(2). Therefore, user devices 40(3), 40(4) are paired with collaboration endpoint 50(3) instead of collaboration endpoint 50(2).

Moreover, the network 70 may be, without limitation, any one or more of local or wide area networks, Internet Protocol (IP) networks such as intranet or internet networks, telephone networks (e.g., public switched telephone networks), wireless or mobile phone or cellular networks, and any suitable combinations thereof. The number of floor levels 30(1)-30(5) of the building 20, user devices 40(1)-40(4), and collaboration endpoints 50(1)-50(4) depicted in FIGS. 1 and 2 are for example purposes only. It is further noted that the network 70 connecting the user device(s) 40(1)-40(4), collaboration endpoints 50(1)-50(4), and server 60 can support communications and exchange of data between any number of user devices 40(1)-40(4) and collaboration endpoints 50(1)-50(4).

Figure 3:
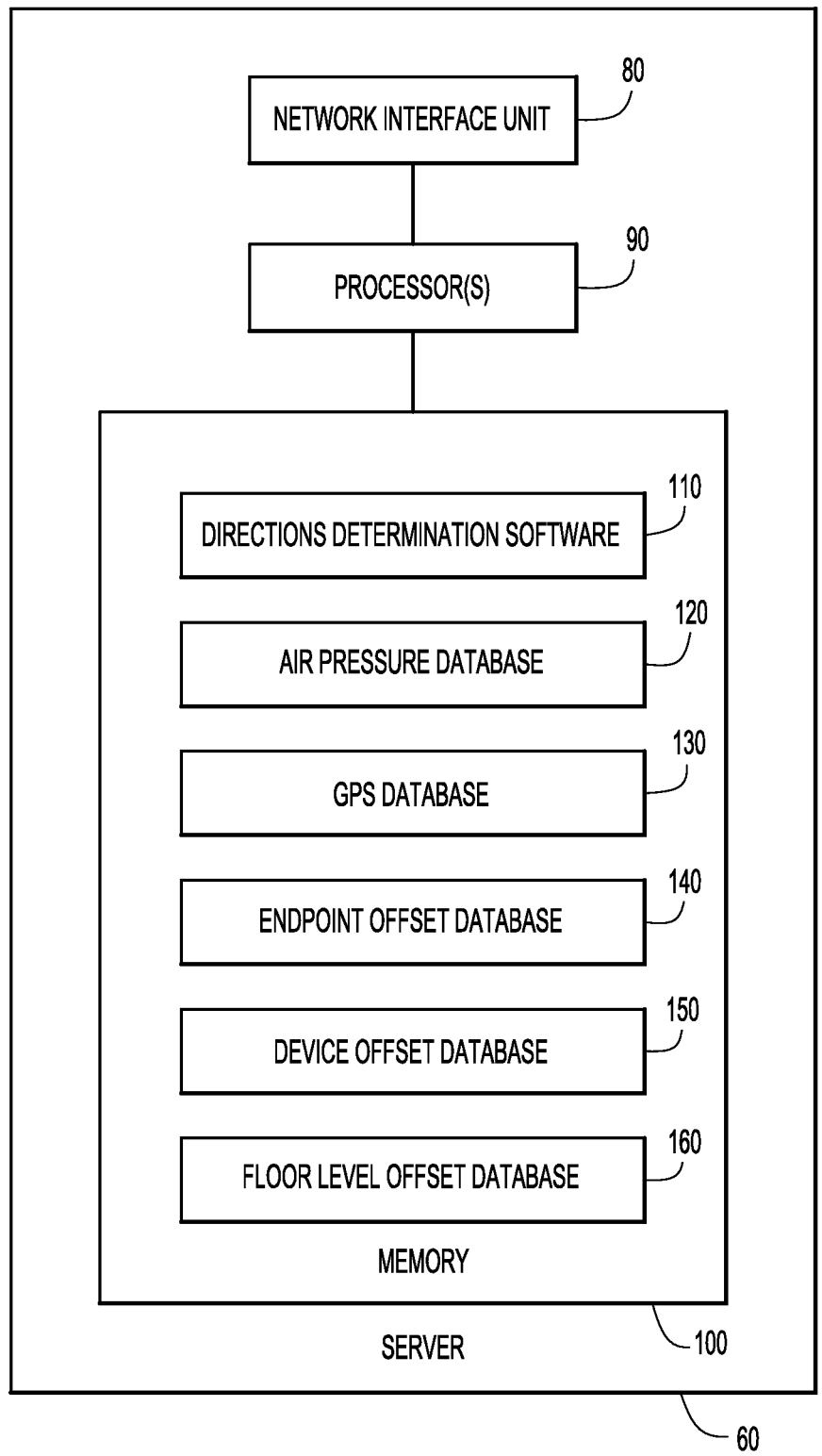
FIG. 3 is an example block diagram of a server illustrated in FIGS. 1 and 2, the server configured to perform the methods presented herein, in accordance with an example embodiment.

Illustrated in FIG. 3 is an example block diagram of the server 60. The server 60 may be configured to perform the techniques presented herein. The server 60 includes a network interface unit 80, a processor(s) 90, and a memory 100. The network interface unit 80 is configured to enable network communications over a network. While conceptually illustrated as a "network interface unit," it will be appreciated that a physical device may contain more than one network interface unit or type of interface to communicate with other devices within a network. For example, network interface unit 80 may include a wireless network interface unit to facilitate wireless communication over the network 70 illustrated in FIGS. 1 and 2.

The processor(s) 90 may be embodied by one or more microprocessors or microcontrollers, and executes software instructions stored in memory 100 for directions determination software 110 in accordance with the techniques presented herein in connection with FIGS. 1, 2, and 5-18.

Memory 100 may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 100 may comprise one or more tangible (e.g., non-transitory) computer readable storage media (e.g., a memory device) encoded with software comprising computer executable instructions, and when the software is executed by the processor(s) 90, the processor(s) 90 is operable to perform the operations described herein in connection with the directions determination software 110 stored in the memory 100. The memory 100 may further store data in an air pressure database 120, a GPS database 130, an endpoint offset database 140, a device offset database 150, and a floor level offset database 160. Collectively, these databases 120, 130, 140, 150, 160 represent an approximate location map of a building. In other approaches, directions determination software 110, air pressure database 120, GPS database 130, endpoint offset database 140, device offset database 150, and floor level offset database 160 are stored remotely, external to the server 60, but accessible by the processor(s) 90. The directions determination software 110 enables the server 60 to receive data (e.g., sensor data, scheduling data, etc.) from the plurality of user devices 40(1)-40(4) and collaboration endpoints 50(1)-50(4). Moreover, the directions determination software 110 enables the server 60 to send data (e.g., sensor data, scheduling data, etc.) to the plurality of user devices 40(1)-40(4) and collaboration endpoints 50(1)-50(4). The directions determination software 110 is configured to receive air pressure and GPS readings from the user devices 40(1)-40(4), where the readings are used to determine the floor levels 30(1)-30(5) and positions of each of the user devices 40(1)-40(4) and collaboration endpoints 50(1)-50(4). The directions determination software 110 further enables the server 60 to develop an approximate location map from the air pressure and GPS readings of the user devices 40(1)-40(4). Each user device 40(1)-40(4) may then receive directions that direct the user device 40(1)-40(4) to the physical location within the building 20 of an upcoming scheduled collaboration meeting.

The functions of the processor(s) 90 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 3 shows that the server 60 may be embodied as a dedicated physical device, it should be understand that the functions of the server 60 may be embodied as software running in a data center/cloud computing system, together with numerous other software applications. Thus, the server 60 may be a server located within or in close proximity with the building 20 or may be a cloud based server.

Figure 4:
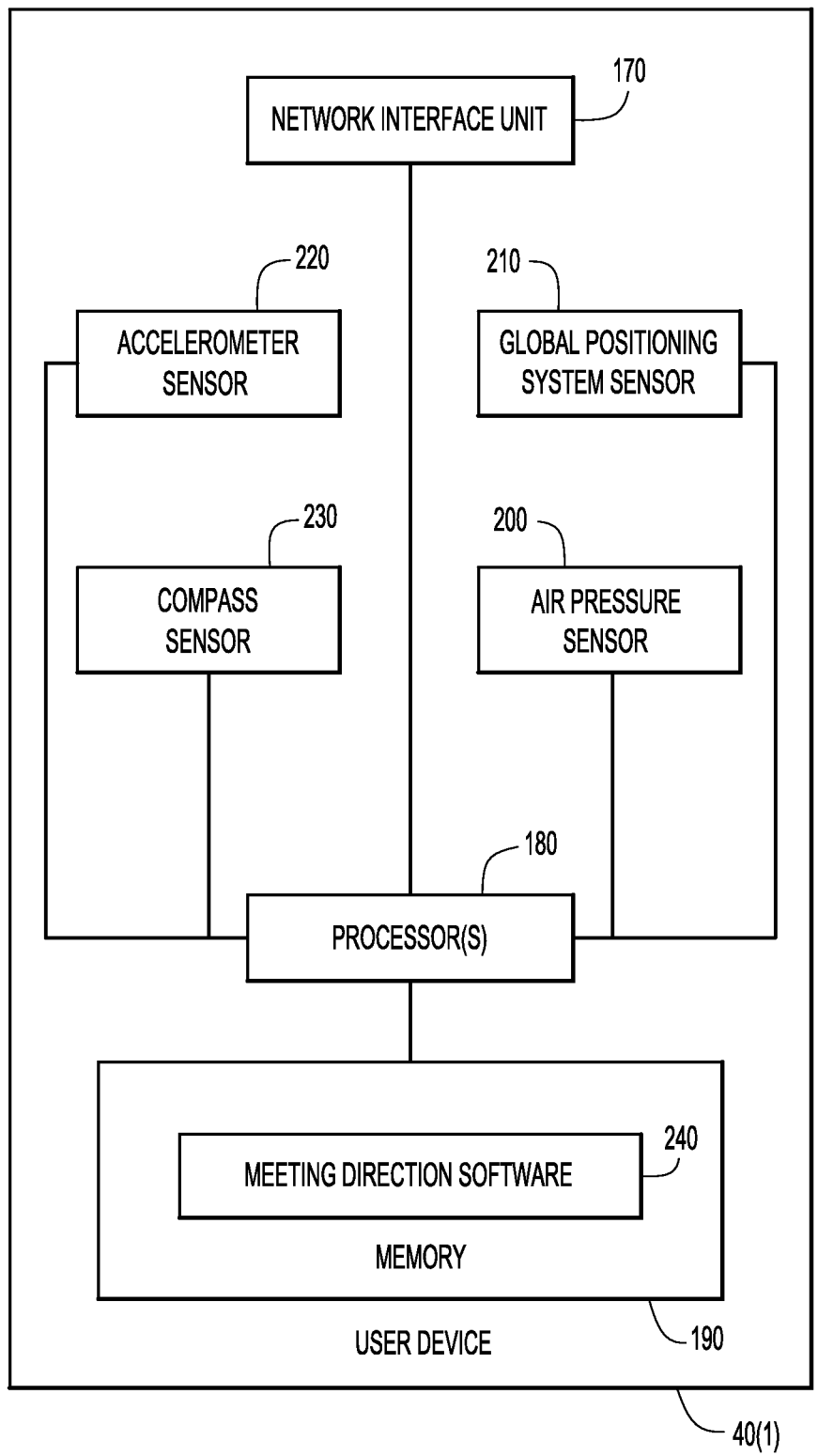
FIG. 4 is an example block diagram of a user device illustrated in FIGS. 1 and 2, and configured to perform the methods presented herein, in accordance with an example embodiment.

Illustrated in FIG. 4 is an example block diagram of user device 40(1). While FIG. 4 illustrates only one user device 40(1), it is to be understood that the configuration of FIG. 4 may be applied to the plurality of user devices 40(1)-40(4) previously described. Some examples of user devices 40(1) include any type of computing device including, without limitation, personal computer (PC) devices, such as stationary (e.g., desktop) computers, laptop computers, or any other type of mobile computing device such as cellular (smart) mobile phones (e.g., cell phones, also referred to as mobile phones), note pads, tablets, personal data assistant (PDA) devices, and other portable media devices.

The user device 40(1) may include a network interface unit 170, a processor(s) 180, and a memory 190. The user devices 40(1)-40(4) may further include an air pressure sensor 200, a GPS sensor 210, an accelerometer 220, and a compass sensor 230. The network interface unit 170 is configured to enable network communications over a network. While conceptually illustrated as a "network interface unit," it will be appreciated that a physical device may contain more than one network interface unit or type of interface to communicate with other devices within a network. For example, network interface unit 170 may include a wireless network interface unit to facilitate wireless communication over the network 70 illustrated in FIGS. 1 and 2. In addition, the network interface unit 170 may include a proximity pairing unit to facilitate the paring of the user device 40(1) with any of the collaboration endpoints 50(1)-50(4) that are within a defined proximity of one another.

The processor(s) 180 may be embodied by one or more microprocessors or microcontrollers. The processor(s) 180 may operate the air pressure sensors 200, GPS sensor 210, the accelerometer 220, and the compass sensor 230 for readings. Furthermore, the processor(s) 180 may execute software instructions stored in memory 190 for meeting directions software 240 in accordance with the techniques presented herein in connection with FIGS. 1, 2, and 5-20.

Memory 190 may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 190 may comprise one or more tangible (e.g., non-transitory) computer readable storage media (e.g., a memory device) encoded with software comprising computer executable instructions, and when the software is executed by the processor(s) 180, the processor(s) 180 is operable to perform the operations described herein in connection with the meeting directions software 240. In other approaches, meeting direction software 240 is stored remotely, external to the user device 40(1), but accessible by the processor(s) 180. The meeting direction software 240 enables the user device 40(1) to send and receive data (e.g., sensor data, scheduling data, directions data, etc.) to and from the server 60. More specifically, the meeting directions software 240 may be configured to send meeting notifications to the server 60, gather the sensor data from the air pressure sensor 200, GPS sensor 210, accelerometer 220, and the compass sensor 230, send the sensor data to the server 60, receive information from the server 60 pertaining to the databases 120, 230, 140, 150, 160, calculate the directions based on the information received from the server 60, and update the directions as the location of the user device 40(1) changes within the building 20. This enables each user device 40(1) to send the appropriate data and receive directions that direct the user device 40(1) to the physical location within the building 20 of an upcoming scheduled collaboration meeting.

The user devices 40(1)-40(4), the collaboration endpoints 50(1)-50(4), the server 60, and other devices of the system 10 can utilize any suitable operating system to transfer data between the server 60, the user devices 40(1)-40(4), and the collaboration endpoints 50(1)-50(4). In addition, the techniques described herein for determining the locations of the user devices 40(1)-40(4) and the collaboration endpoints 50(1)-50(4), and for determining the directions with which to provide the user devices 40(1)-40(4) via the location determination system 10 can be integrated with any suitable type of commercial software products.

Figure 5:
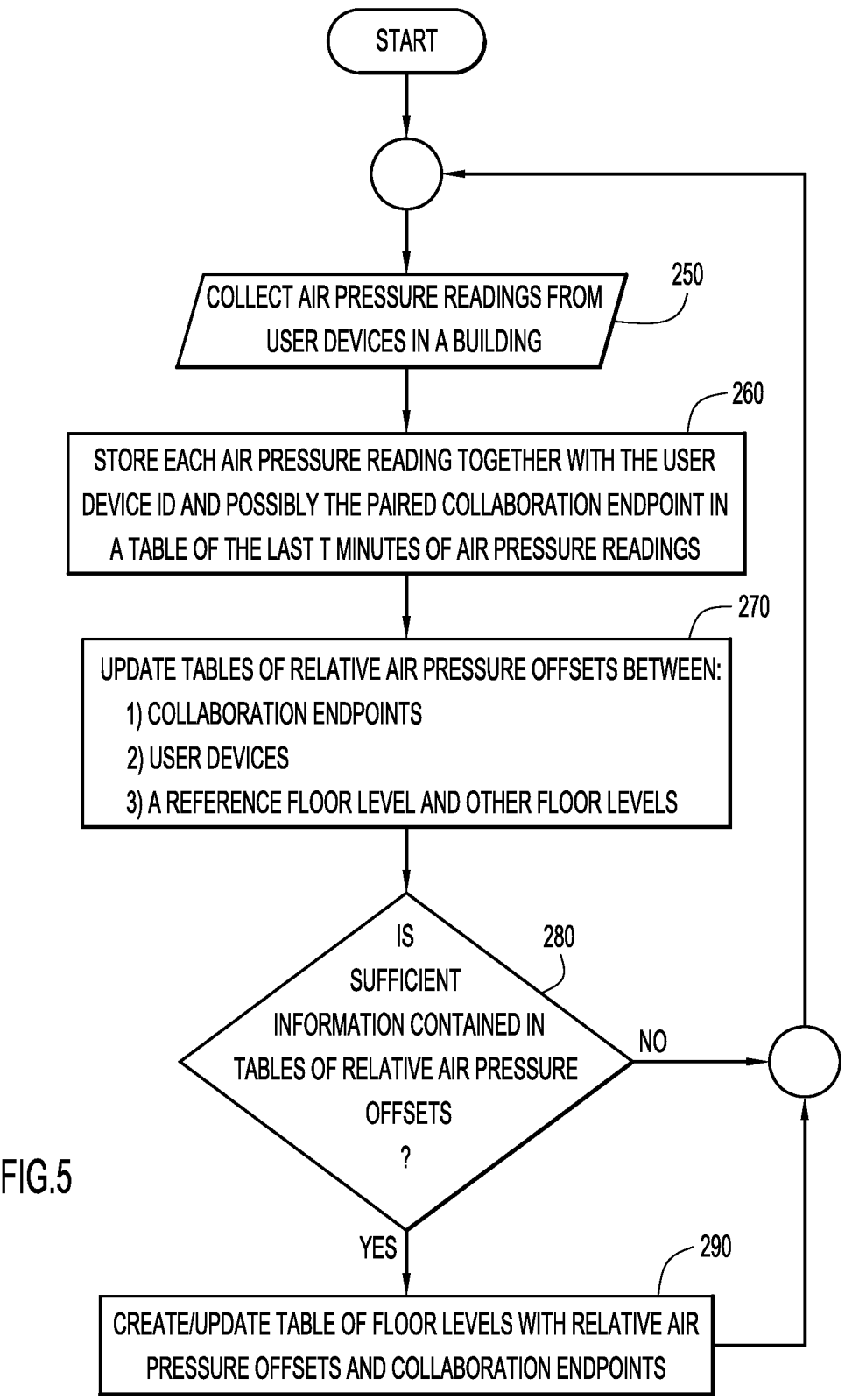
FIG. 5 is a flow diagram depicting in more detail operations performed by the server to determine pressure offsets between user devices and pressure offsets between collaboration endpoints within the building, according to an example embodiment.

FIG. 5 illustrates a flow diagram that depicts, from the perspective of the server 60, the server 60 creating a table of user devices 40(1)-40(4) and collaboration endpoints 50(1)-50(4), and their relative floor levels 30(1)-30(5) via the directions determination software 110. Reference is also made to FIGS. 1-4 for purposes of the description of FIG. 5. At 250, the server collects or gathers air pressure readings from the user devices within the building. As previously explained, the user devices 40(1)-40(4) may be equipped with an air pressure sensor 200. The air pressure sensor 200 may be configured to provide air pressure at the location of the user device 40(1)-40(4) within the building 20. The user devices 40(1)-40(4) may send the server 60 the air pressure readings via the network 70. At 260, the server stores each of the air pressure readings together with a user device identification and possibly the collaboration endpoint that is paired within a user device at the time of the air pressure reading. Furthermore, at 260, the air pressure readings are stored (e.g., in a table), similar to that illustrated in FIG. 12, for the last T minutes of air pressure readings. The value of T may represent a short time interval, such as less than 10 minutes. For example, as illustrated in FIG. 1, air pressure readings from user device 40(1) will be given a user device identification that labels the air pressure reading as belonging to the user device 40(1). Moreover, because the user device 40(1) is paired with the collaboration endpoint 50(1), the air pressure reading from the user device 40(1) will be labeled as being paired with collaboration endpoint 50(1). Similarly, air pressure readings from user devices 40(2), 40(3) will be labeled with user device identifications of user devices 40(2), 40(3) and collaboration endpoint 50(3). Air pressure readings from user device 40(4), however, will only be labeled with the user device identification for user device 40(4) because user device 40(4) is not paired with a collaboration endpoint 50(1)-50(4).

At 270, the server calculates offsets and updates stored data (e.g., tables) of relative air pressure offsets between the collaboration endpoints, user devices, and floor levels. The calculated offsets of the collaboration endpoints may be stored in the endpoint offset database 120 of the server 60. The calculated offsets of the user devices may be stored in the device offset database 130 of the server 60. In addition, the calculated offsets of the floor levels may be stored in the floor level offset database 140 of the server 60. Offsets may be calculated in various different ways. In one situation, when a user device is paired with a collaboration endpoint, and then within a short time interval, such as within the time interval T, pairs within another collaboration endpoint, the relative pressure difference between the two collaboration endpoints can be computed by the server. For example, as illustrated in FIG. 1, user device 40(1) is paired with collaboration endpoint 50(1) on floor level 30(1). If user device 40(1) travels to floor level 30(2) and pairs with collaboration endpoint 50(2) within the short time interval T, then the air pressure difference between collaboration endpoint 50(1) and collaboration endpoint 50(2) can be computed by the server 60 with the user device 40(1) serving as the reference between the two collaboration endpoints 50(1), 50(2). The air pressure difference, or collaboration endpoint offsets, of the collaboration endpoints 50(1)-50(4) may be stored in the endpoint offset database 140 of the server 60, which is similar to the table illustrated in FIG. 13.

In a second situation, when two user devices are simultaneously paired with a collaboration endpoint, the relative air pressure difference between those two user devices may be calculated. Once the relative air pressure differences, or user device offsets, are known between two user devices, whenever the first user devices is paired with a first collaboration endpoint and the second device is paired with a second collaboration endpoint, the relative pressure difference between the two collaboration endpoints can be computed by taking into account the relative offsets between the two user devices. For example, as illustrated in FIG. 1, user devices 40(2), 40(3) are each paired with collaboration unit 50(3). Thus, the relative pressure difference, or offset, between the user devices 40(2), 40(3) can be calculated. If user device 40(2) travels to floor level 30(1) and pairs with collaboration endpoint 50(1), while user device 40(3) travels to floor level 30(4) and pairs with collaboration endpoint 50(4), the relative pressure difference, or offset, between collaboration endpoint 50(1) and collaboration endpoint 50(4) may be computed by using the known offset between the user devices 40(2), 40(3). The air pressure difference, or user device offsets, of the user device 40(1)-40(4) may be stored in the device offset database 150, similar to that illustrated in FIG. 14. In addition, the relative air pressure difference, or collaboration endpoint offsets, of the collaboration endpoints 50(1)-50(4) may be stored in the endpoint offset database 140 of the server 60, which is similar to the table illustrated in FIG. 13, described hereinafter.

Another situation occurs when there is one user device that belongs to a group of user devices for which the user device offsets are known between all of the user devices in the group, and there is a second user device with unknown user device offsets with respect to other user devices in the group. The first user device is paired with a first collaboration endpoint, and the second user device is simultaneously paired with a second collaboration endpoint with a known collaboration endpoint offset to the first collaboration endpoint. The user device offset between the first and second user devices and between the second user device and the rest of the user devices in the group can be calculated by the server. For example, as illustrated in FIG. 1, the user device offsets between user devices 40(1)-40(3) may be known, but the user device offset of user device 40(4) to the remaining user devices 40(1)-40(3) may be unknown. Furthermore, the collaboration endpoint offsets between collaboration endpoint 50(1) and collaboration endpoint 50(4) may also be known. Thus, when user device 40(1) is paired with collaboration endpoint 50(1), and, at the same time, user device 40(4) pairs with collaboration endpoint 50(4), then the user device offsets between user device 40(4) and user devices 40(1)-40(3) can be calculated by the server 60. The air pressure difference, or user device offsets, of the user device 40(1)-40(4) may be stored in the device offset database 150 of the server 60, which is similar to the table illustrated in FIG. 14, described hereinafter.

In addition, when a first user device is paired with a collaboration endpoint, and a second user device with known user device offset to the first user device is in the same building, the server may begin collecting the relative pressure differences between the two user devices as they move throughout the building. GPS information and/or Wi-Fi® positioning may be used to determine that the user devices are located within the same building. The collection of relative pressure differences between the two user devices may happen in regular intervals, such as once a minute, or may be gathered when the user devices move between locations. Accelerometer 220 and compass sensor 230 (shown in FIG. 4) of the user devices may be used to determine if the user devices are being moved from one location to another. The collected relative pressure differences, over time, may be stored in a table, which is similar to that illustrated in FIG. 15. For example, as illustrated in FIG. 1, the user device offset may be known between user device 40(1), which is paired with collaboration endpoint 50(1) on floor level 30(1), and user device 40(4), which is not paired with a collaboration endpoint 50(1)-50(4). If user device 40(1) remained on floor level 30(1) and paired with collaboration endpoint 50(1), and user device 40(4) travels throughout the building 20 to various floors 30(1)-30(5), the relative pressure differentials between the user devices 40(1) and 40(4) can be calculated for each floor level 30(1)-30(5) that user device 40(4) visits. Thus, the floor level offsets for each of the floor levels 30(1)-30(5) may be calculated by the server 60. The floor level pressure differentials, or floor level offsets, of the floor levels 30(1)-30(5) may be stored in the floor level offset database 160 of the server 60, which is similar to the table illustrated in FIG. 16, described hereinafter.

Figure 16:
FIG. 16 is a table depicting in more detail the relative floor level pressure offsets, according to an example embodiment.

At 280, the server determines if sufficient information is contained in the air pressure database 120, endpoint offset database 140, device offset database 150, and floor level offset database 160. If the server determines that there is not sufficient information contained within the databases 120, 140, 150, 160, then the server returns to collecting air pressure readings from the user devices as described at 250. However, if the server determines that there is sufficient information contained within databases 120, 140, 150, 160, then, at 290, the server creates or updates the floor level offset database 160 based on the gathered air pressure information. As illustrated in FIG. 16, the floor level offset database 160 may also include the collaboration endpoints 50(1)-50(4) and their respective floor levels 30(1)-30(5).

Figure 6:
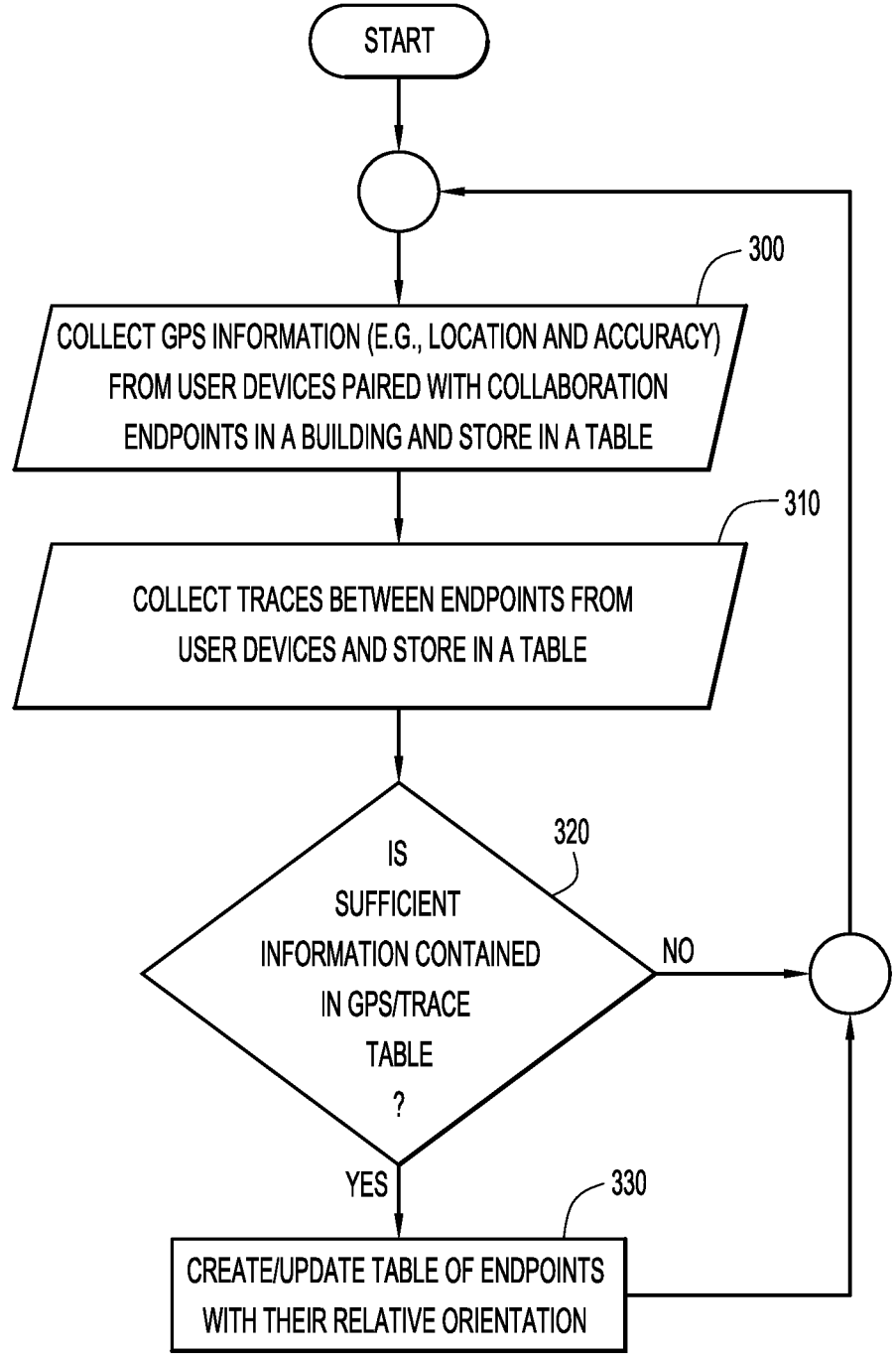
FIG. 6 is a flow diagram depicting in more detail operations performed by the server to collect and determine global positioning system positions and orientations of user devices and collaboration endpoints within the building, according to an example embodiment.

FIG. 6 illustrates a flow diagram that depicts, from the perspective of the server 60, the server 60 gathering and collecting a table of relative orientation of collaboration endpoints 50(1)-50(4) based on collected GPS information or trace information. Reference is also made to FIGS. 1-4 for purposes of the description of FIG. 6. At 300, the server collects or gathers GPS readings from the user devices within the building that are paired with collaboration endpoints. As previously explained, the collaboration endpoints and the user devices may execute proximity pairing technologies that enable the user devices to pair with the collaboration endpoints once they are in proximity of each other. For example, as illustrated in FIG. 2, user devices 40(2), 40(3) are in closer proximity with collaboration endpoint 50(3) than with collaboration endpoint 50(2), and thus user devices 40(2), 40(3) are paired with collaboration endpoint 50(3). As previously explained, each of the user devices 40(1)-40(4) may be equipped with a GPS sensor 210. Whenever a user device 40(1)-40(4) is paired with a collaboration endpoint 50(1)-50(4), the collaboration endpoint 50(1)-50(4) may obtain access to the GPS readings from the GPS sensor 210 of the user devices 40(1)-40(4). In one embodiment, the GPS readings may be received by the server 60 from the collaboration endpoints 50(1)-50(4) that are paired with user devices 40(1)-40(4). As illustrated in FIG. 1, collaboration endpoints 50(1) and 50(3) may send GPS readings because these collaboration endpoints 50(1), 50(3) are paired with user devices 40(1)-40(3). In another embodiment, the GPS readings may be received by the server 60 from the user devices 40(1)-40(4) that are paired with collaboration endpoints 50(1)-50(4). Thus, as illustrated in FIG. 1, because user device 40(4) is not paired with a collaboration endpoint 50(1)-50(4), only user devices 40(1)-40(3) may send GPS readings to the server 60.

Figure 17:
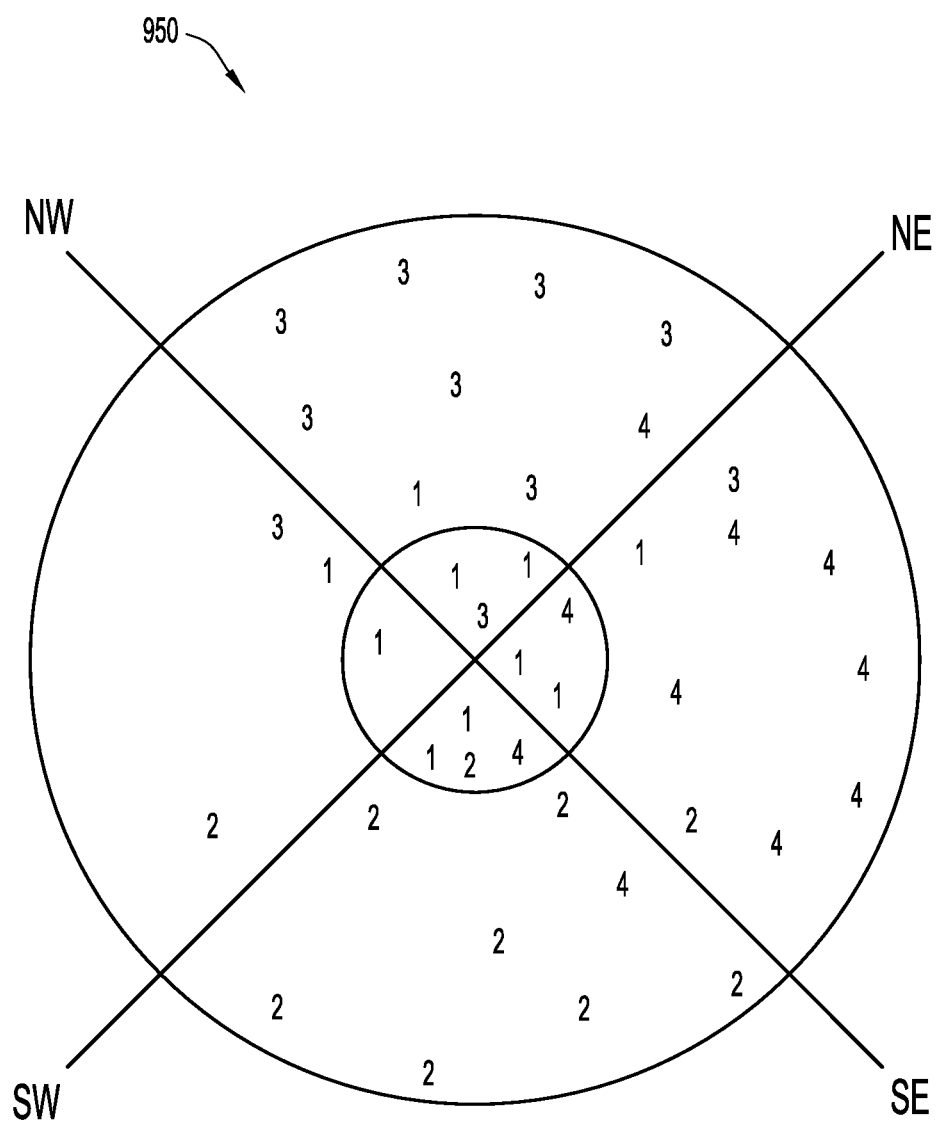
FIG. 17 is a chart depicting in more detail the GPS measurements obtained from user devices when paired with collaboration endpoints, according to an example embodiment.

Furthermore, because the user devices 40(1)-40(4) are located within the building 20, the GPS readings may be inaccurate. However, by collecting GPS readings over a period of time and from a plurality of user devices 40(1)-40(4), the accuracy of the GPS readings may be sufficient to provide a relative orientation of the collaboration endpoints 50(1)-50(4) within a building 20. In other words, by gathering enough GPS readings of user devices 40(1)-40(4) paired with collaborations endpoints 50(1)-50(4), the relative location of the collaboration endpoints 50(1)-50(4) on the floor levels 30(1)-30(5) may be determined. The GPS readings may be stored in the GPS database 130, as illustrated in FIGS. 17 and 18 described hereinafter. The GPS database 130 may store all of the collected GPS readings and a table that indicates each of the collaboration endpoints and their relative orientation within the building. The collaboration endpoints may be assigned a relative orientation within the building of north, east, south, west, center, northeast, southeast, southwest, and northwest.

In the event that the multiple GPS readings are unable to be collected, or the number of GPS readings collected is insufficient to determine the relative orientation of the collaboration endpoints, the server may rely on estimated trace paths from the user devices to determine the relative orientation of the collaboration endpoints. One way of estimating trace paths is with dead reckoning techniques, where the inertial sensors of the user devices, such as the accelerometer 220 and the compass 230, may be used to estimate a new location based on a known previous location. The accelerometer 220 and compass 230 may be used to continuously estimate the current location of the user device as it travels away from a collaboration endpoint. In the event that the user device pairs with another collaboration endpoint, the server may be provided with a trace from one collaboration endpoint to the other collaboration endpoint. With sufficient traces, the server may be able to compute estimates of relative locations between collaboration endpoints in the building. Thus, in addition to collecting GPS readings, the server, at 310, may collect the trace path information from the user devices and store them in a table. The server may store the trace path information in the GPS database 130, as previously described, or in another database similar to the GPS database 130. At 320, the server may determine if there is sufficient information contained in the GPS/trace table to indicate the relative orientation of the collaboration endpoints within the building. If the server does determine that there is sufficient information contained in the GPS/trace table, then at 330, the server updates the table with their relative orientation (e.g., north, east, south, west, center, northeast, southeast, southwest, and northwest). However, if, at 320, the server determines that there is not sufficient information contained within the GPS/trace table, the server returns to collecting GPS and/or trace path information from the user devices paired with collaboration endpoints at 300.

In addition to colleting GPS readings and dead reckoning techniques, the server may also implement at third method of obtaining relative locations of the collaboration endpoints. The server may use an already existing indoor location system. If the building already has an indoor location system that can be used to locate user devices within the building, the server can receive the locations of user devices that are paired with at least one collaboration endpoint. These locations can be used to calculate the relative orientation of the collaboration endpoints in the same way as the relative locations found with GPS readings or the dead reckoning techniques.

Figure 7:
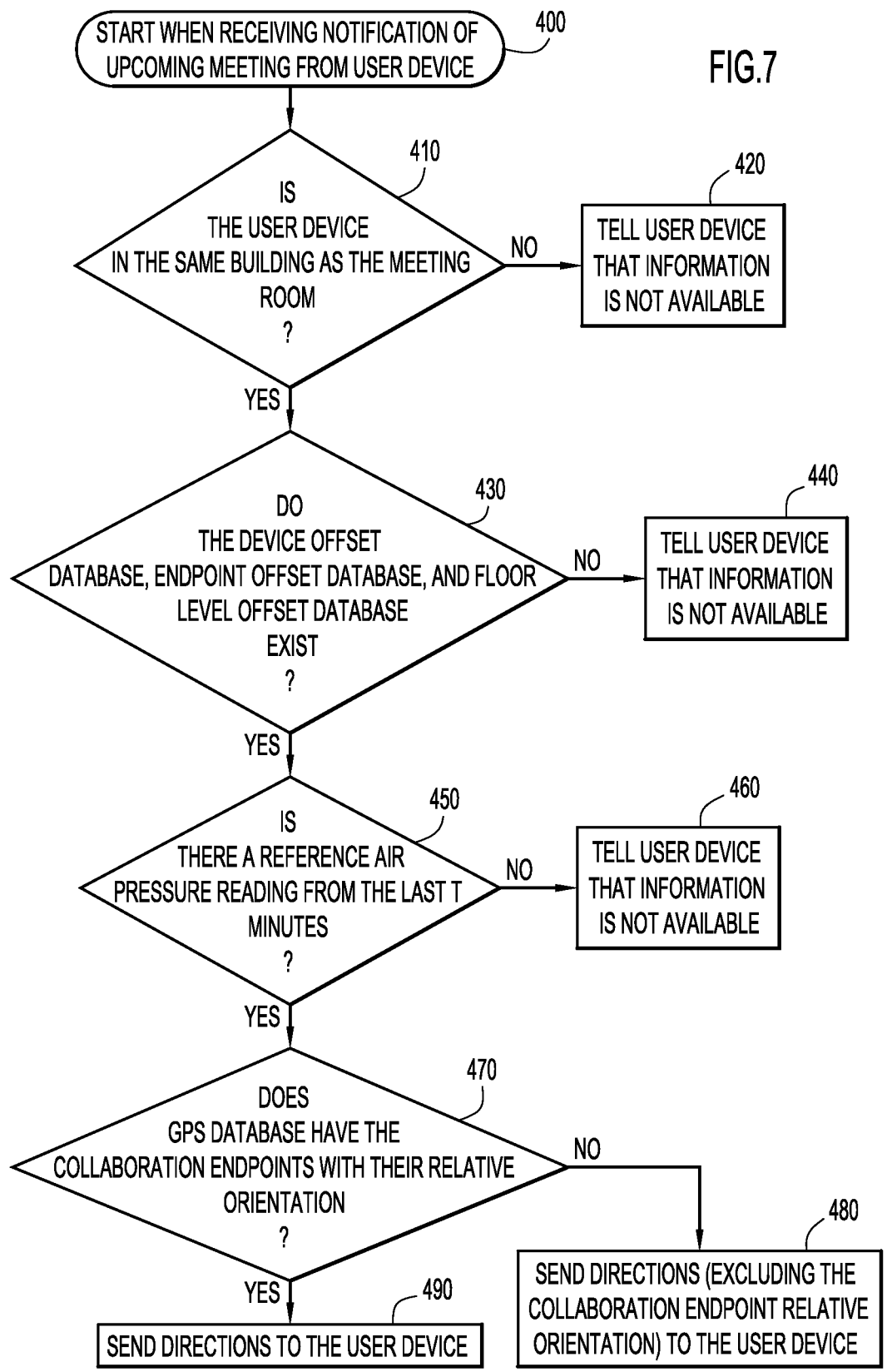
FIG. 7 is a flow diagram depicting in more detail operations performed by the server for determining directions to send for a user device, according to an example embodiment.

Turning to FIG. 7, illustrated is a flow diagram that depicts, from the perspective of the server 60, the server determining whether or not to send to the user device via the directions determination software 110 the data of the approximate location map to enable the user device to calculate the directions. Reference is also made to FIGS. 1-6 for purposes of the description of FIG. 7. At 400, the server receives a notification from the user device of an upcoming meeting that is to be attended by the user device. The notification may be created from scheduling or calendaring software available on the user device and/or the server. At 410, the server determines if the user device is in the same building as the meeting room. As previously explained, GPS and/or Wi-Fi positioning may be used to determine if the user devices are within the same building as the meeting rooms/collaboration endpoints. Furthermore, as previously explained, collaboration endpoints may be located in meeting rooms or meeting locations within the building. If the server determines that the user device is not within the same building, then at 420, the server informs the user device that the directional information is not available to be sent to the user device. However, if the user device is within the same building as the meeting room, then the server, at 430, will determine if there are entries in the endpoint offset database 140, device offset database 150, and floor level offset database 160 for the user devices, collaboration endpoints and floor levels of the building containing the meeting room. If the databases 140, 150, 160 do not contain entries for the building containing the meeting room, then at 440, the server informs the user device that the directional information is not available to be sent to the user device.

If the databases 140, 150, 160 contain data for the building and meeting room, the server, at 450, determines if there is a reference air pressure reading from the last T minutes. As previously explained in reference to FIG. 5, the value of T may represent a short time interval, such as less than 10 minutes. Furthermore, as previously explained with reference to FIGS. 1, 2, and 5, reference air pressure readings may originate from a collaboration endpoint 50(1)-50(4) that is or has been paired with a user device, where the user device has a known relative pressure sensor offset to the user device that received the meeting notification. If there are no such recent pressure readings from any collaboration endpoint paired with user devices, it is possible to receive reference air pressure readings from user devices in the building with a known air pressure offset to that of the user device that received the meeting notification. For example, in reference to FIG. 1, if two user devices 40(1)-40(4) are in the building 20 with a known air pressure offset, and these two user devices 40(1)-40(4) have a difference in pressure that is similar to the pressure difference between the lowest floor level 30(1) and the highest floor level 30(5), then an assumption can be made that the two user devices 40(1)-40(4) are on the bottom floor level 30(1) and top floor level 30(5). Either of these two user devices 40(1)-40(4) can then be used as a reference by the server to determine the directions to the meeting.

If there are no reference air pressure readings within the last T minutes, the server at 460, informs the user device that the directional information is not available to be sent to the user device. Conversely, if there is a reference air pressure reading within the last T minutes, then at 470, the server determines if the GPS database 130 contain the collaboration endpoints with their relative orientations. If the server determines that the GPS database 130 does not exist, then, at 480, the server sends information to the user device that excludes the collaboration endpoint orientation within the building. If the GPS database 130 does not contain sufficient information to indicate the relative orientation of the collaboration endpoints within the building, then the server will only provide the user devices with the floor level information based on the information and data in the floor level offset database 160. However, if the server determines that the GPS database 130 does exist, then at 490, the server sends directions to the user device based on information and data in the floor level offset database 160 and the GPS database 130.

Figure 19:
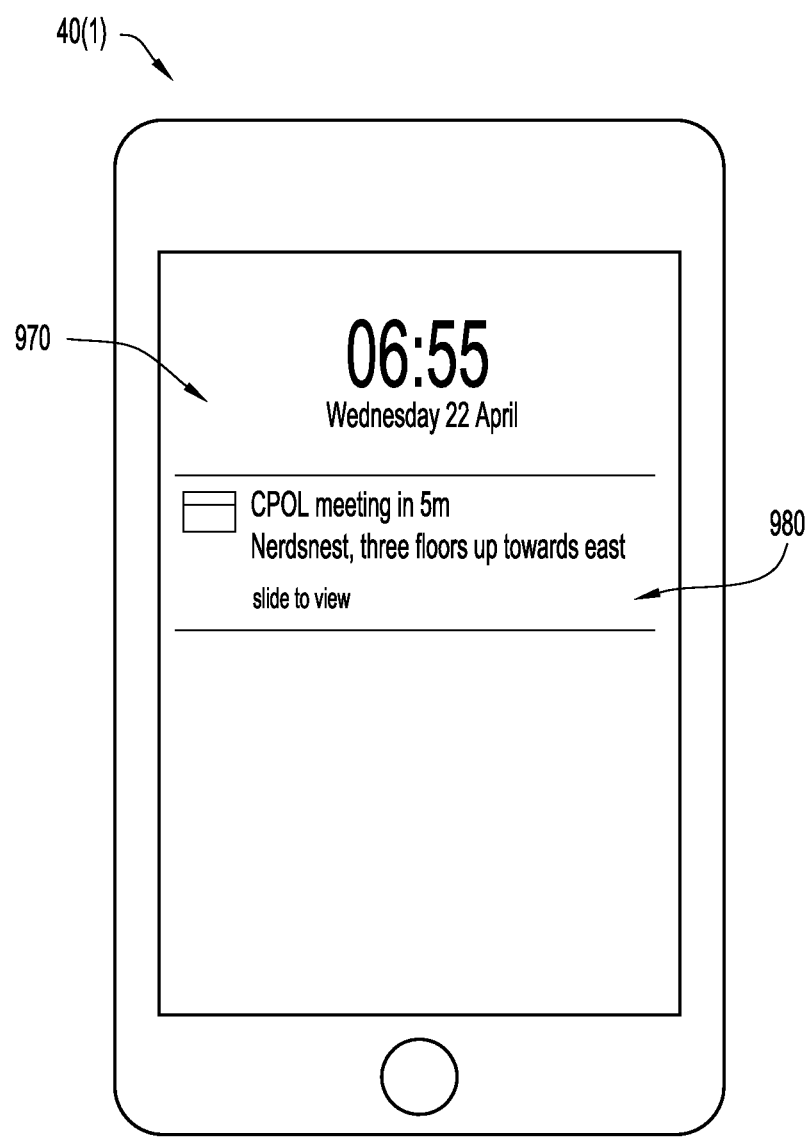
FIG. 19 is a front view of a user device displaying the directions to the meeting location, according to an example embodiment.

If reference air pressure readings are available, the server may send a message to the user devices that are scheduled to attend the meeting. The message sent to the user devices may include the reference pressure reading along with its reference floor level, the known user device offset, and the age of the reference air pressure reading. The message may further contain the floor level and the orientation of the desired meeting room based on the collaboration endpoint located within the meeting room. Furthermore, the message may include a table of pressure differences between the floor levels. This information together with an air pressure reading from the user device that receives the directions from the server can be used to calculate the floor level of the user device receiving the directions relative to the floor level of the desired meeting room. The difference in the floor level along with the orientation of the meeting room is displayed to the user, as illustrated in FIG. 19, described hereinafter.

Once the user device receives this information from the server, the user device now contains all the information needed to re-calculate the difference in the floor levels at regular intervals (e.g., every second, efficiently and without a network connection). As soon as the user device detects a change in the floor level, the information displayed on the mobile device is updated. However, if the age of the reference pressure reading exceeds the time period T (e.g., 10 minutes), the user device may send a new notification about the upcoming meeting to the server to acquire updated information.

In addition, if there are no recent reference air pressure readings in the building, the server may look for recent reference air pressure readings in another nearby building, as long as the nearby building has an approximate location map and the difference in pressure between floor levels of the two buildings are known. For example, a first user device may be in a first building and is planning on attending a meeting at a first collaboration endpoint. A second user device may be in a second building and is currently paired with a second collaboration endpoint in the second building. In addition, the pressure offset between the floor level of the first collaboration endpoint in the first building and the floor level of the second collaboration endpoint in the second building is known. The user device offset between the first user device and the second device are also known. When this information is known, a first user device can use the pressure reading from the second user device as a reference pressure reading and taking into account the known offsets.

If a reference air pressure reading with known relative offset to the user device that sent the meeting notification is not known, then reliable floor level information cannot be given to the user device.

Figure 8:
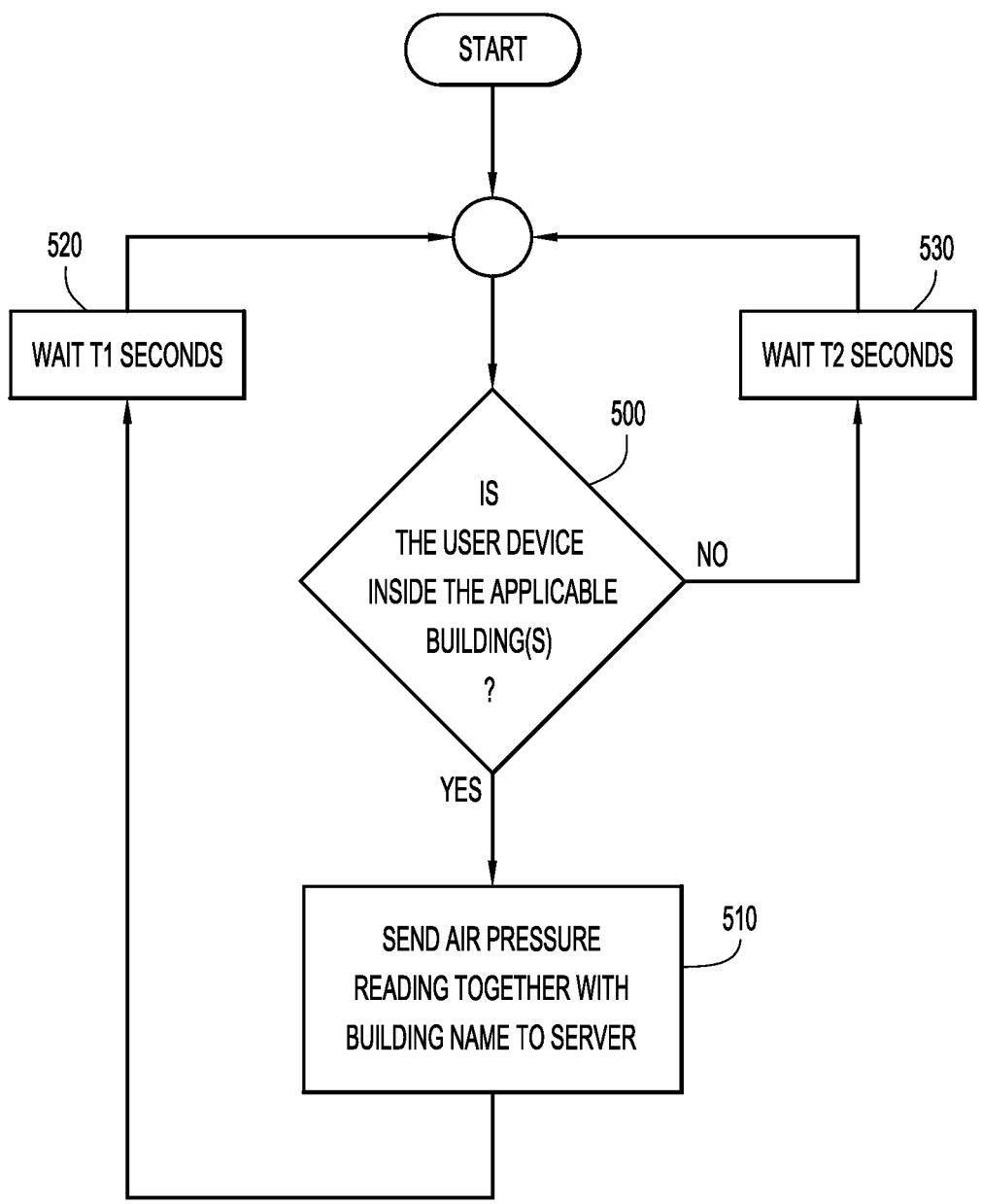
FIG. 8 is a flow diagram depicting in more detail operations performed by the user device within the building to send the air pressure measurements to the server, according to an example embodiment.

FIG. 8 illustrates a flow diagram that depicts, from the perspective of the user devices 40(1)-40(4), the user devices 40(1)-40(4) determining when to send the air pressure readings to the server 60. Reference is also made to FIGS. 1-4 for purposes of the description of FIG. 8. As previously explained with reference to FIG. 4, the user devices 40(1)-40(4) may each contain an air pressure sensor 200 that is configured to provide air pressure readings of the area immediately surrounding the user device 40(1)-40(4). At 500, the user device determines if it is within the building that contains the meeting room. As previously explained, GPS information and/or Wi-Fi positioning may be used to determine in which buildings the user devices are located. If the user device is within the applicable building, then at 510, the user device sends air pressure readings to the server. As previously explained with reference to FIG. 4, the air pressure readings are taken by the air pressure sensor 200 located within each of the user devices 40(1)-40(4). At 520, after waiting T1 seconds after the user device sends the air pressure readings, the user device begins the process over again at block 500. However, if the user device determines it is not within the applicable building, then at 530, the user device waits T2 seconds before returning to 500 and determining again if the user device is in the applicable building. The values of T1 and T2 may be predetermined and may be equal to or different from one another.

Figure 9:
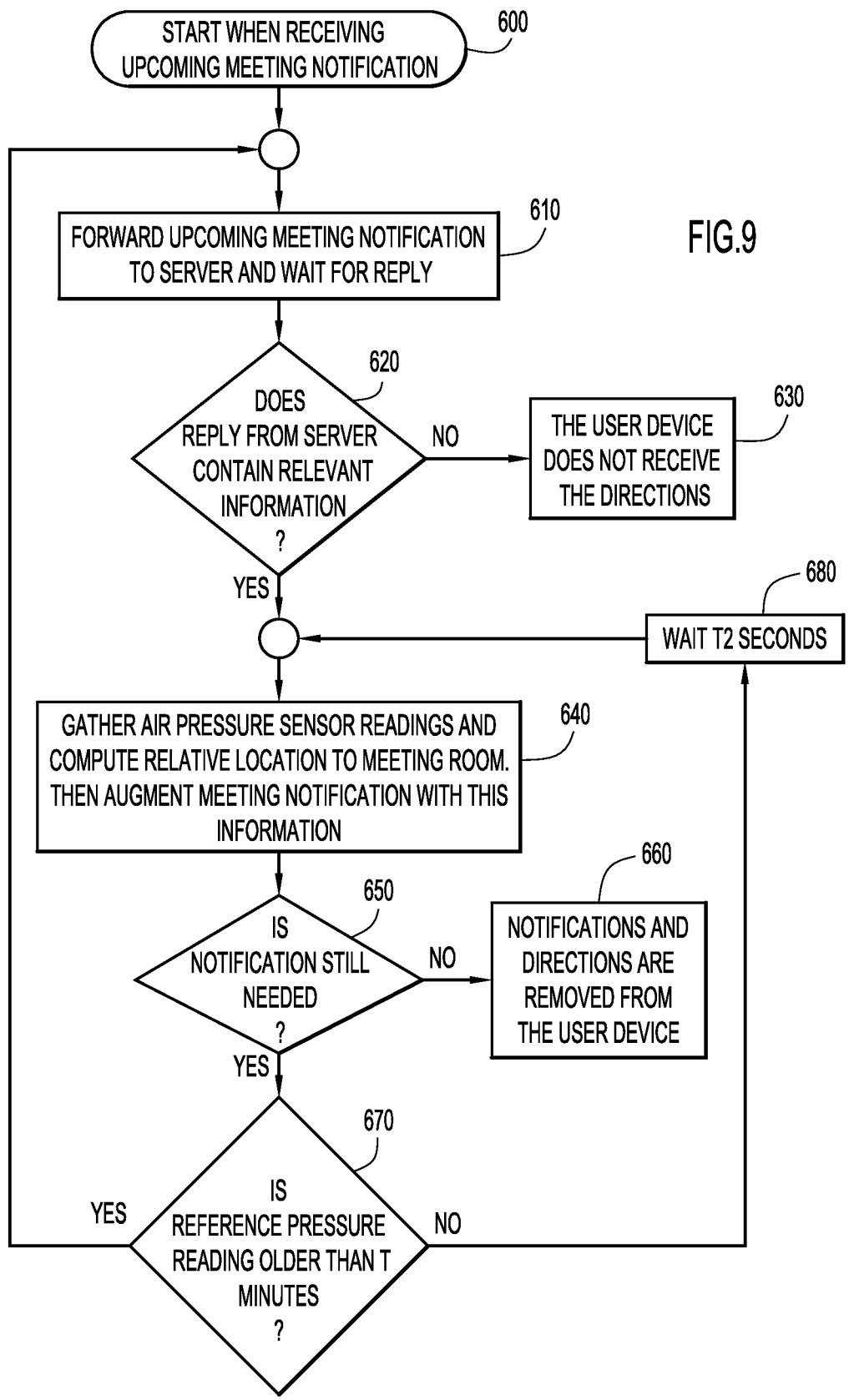
FIG. 9 is a flow diagram depicting in more detail operations performed by the user device to notify the server of a meeting and receive directions to the meeting location from the server, according to an example embodiment.

FIG. 9 illustrates a flow diagram that depicts, from the perspective of the user devices 40(1)-40(4), the user devices 40(1)-40(4) sending the notification of the upcoming meeting to the server 60 and receiving directions to the meeting location from the server 60 via the meeting directions software 240. Reference is also made to FIGS. 1-4 for purposes of the description of FIG. 9. At 600, the user device receives a notification of an upcoming scheduled meeting. At 610, the user device sends the meeting notification to the server and waits for a reply from the server. The server receives and processes the meeting notification as previously described with reference to FIG. 7. At 620, the user device determines if the reply from the server contained relevant information pertaining to the directions to the meeting location. If the reply does not contain relevant information, then at 630, the user device does not receive directions to the meeting location. As previously explained with reference to FIG. 7, if the server determines that the user device is not located within the same building as the meeting location, the necessary databases 140, 150, 160 do not exist, or that there is not a reference air pressure reading within the last T minutes, then the reply from the server will not include relevant information.

However, if the reply from the server did contain relevant information, then at 640, the user device gathers air pressure readings and computes a relative location to the meeting room. For example, if the reply from the server indicates the floor level within the building that the meeting room is located, the user device will use a reference air pressure reading to determine its location within the building and how many floor levels the user device needs to travel. Furthermore, at 640, the user device augments the meeting notification with the computer information. Thus, as the user device changes locations within the building, the number of floor levels the user device needs to travel to get to the meeting location will be updated. For example, as illustrated in FIG. 1, if user device 40(1) has an upcoming meeting proximate to collaboration endpoint 50(4), which is located on floor level 30(4), then user device 40(1) would calculate that user device 40(1) would need to travel upwards three floor levels within building 20 to reach collaboration endpoint 50(4). As user device 40(1) reaches floor level 30(2), user device 40(1) will updated the directions to indicate that user device 40(1) now only needs to travel upwards two floor levels within building 20 to reach collaboration endpoint 50(4).

At 650, the user device determines if the notification is still needed. The user device may no longer need the notification of the upcoming meeting for multiple reasons. If the user device arrived at the location of the meeting, if the meeting was canceled or rescheduled, or if the meeting is over, the notification would no longer be needed. If at 650 it is determined that the notification is no longer needed, then the notification and directions to the upcoming meeting are removed from the user device, as indicated at 660. However, if the notification is still needed, then at 670, the user device determines if the reference air pressure reading is older than T minutes. If the reference air pressure reading is not older than T minutes, then at 680, the user device waits T3 seconds, and returns to 640, where the user device re-gathers air pressure readings and computes a relative location to the meeting room. The value of T3 may be predetermined and may be equal to or lesser than the times periods of T1 and T2, which were explained previously with reference to FIG. 8. If the reference air pressure reading is older than T minutes, then the user device returns to 610, where it resends the upcoming meeting notification to the server and waits for a reply.

Figure 10:
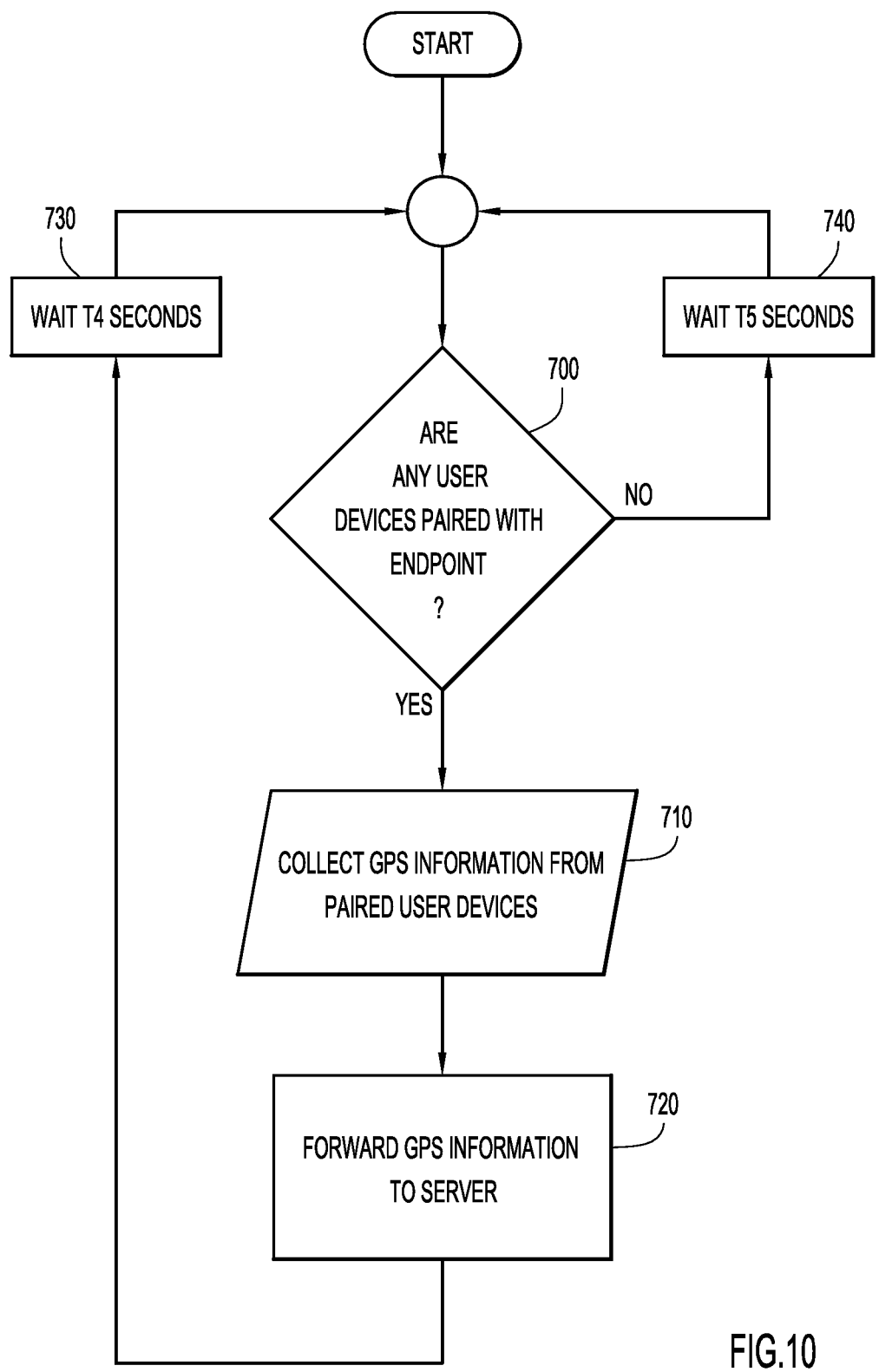
FIG. 10 is a flow diagram depicting in more detail operations performed by the collaboration endpoint within the building to send the Global Positioning System (GPS) information to the server, according to an example embodiment.

Turning to FIG. 10, illustrated a flow diagram that depicts, from the perspective of the collaboration endpoints 50(1)-50(4), the collaboration endpoints 50(1)-50(4) gathering and sending GPS information to the server 60. Reference is also made to FIGS. 1-4 for purposes of the description of FIG. 10. At 700, the collaboration endpoint determines if any user devices are paired with the collaboration endpoint. As previously explained with reference to FIG. 1, collaboration endpoints 50(1)-50(4) and user devices 40(1)-40(4) are configured to pair with one another via proximity pairing. Thus, collaboration endpoint 50(1) is paired with user device 40(1). Moreover, collaboration endpoint 50(3) is paired with user devices 40(2), 40(3). Collaboration endpoints 50(2), 50(4) are not paired with user devices 40(1)-40(4) as illustrated in FIG. 1. If, at 700, the collaboration endpoint determines that it is paired with a user device, then at 710, the collaboration endpoint collects or gathers the GPS information from the user device that it is paired with. As previously explained with reference to FIG. 4, each of the user devices 40(1)-40(4) may be equipped with GPS sensors 210 that provide GPS positioning and location data. As illustrated in FIG. 1, collaboration endpoint 50(1) would collect GPS information from user device 40(1), while collaboration endpoint 50(3) would collect GPS information from user devices 40(2), 40(3). Once the collaboration endpoint collects the GPS information from the user devices paired with it, at 720, the collaboration endpoint forwards the GPS information to the server so that the server may establish the GPS database 130, as explained previously with reference to FIG. 6. Then the collaboration endpoint, at 730, waits T4 seconds, before returning to 700 to determine if it is paired with any user devices. The return to 700 may show that new user devices have paired with the collaboration endpoint or that the previous user devices are still paired with the collaboration endpoint. However, if, at 700, it is determined that no user devices are paired with the collaboration endpoint, then at 740, the collaboration endpoint waits T5 seconds to check again for any paired user devices at 700. This cycle of checking for paired user devices and waiting T5 seconds repeats until there is a user device paired with the collaboration endpoint. Furthermore, the values of T4 and T5 may be predetermined and may be equal to, greater than, or lesser than the times periods of T1, T2, and T3, which were explained previously with reference to FIGS. 8 and 9. Moreover, the values of T4 and T5 may be equal to or different from one another.

Figure 11:
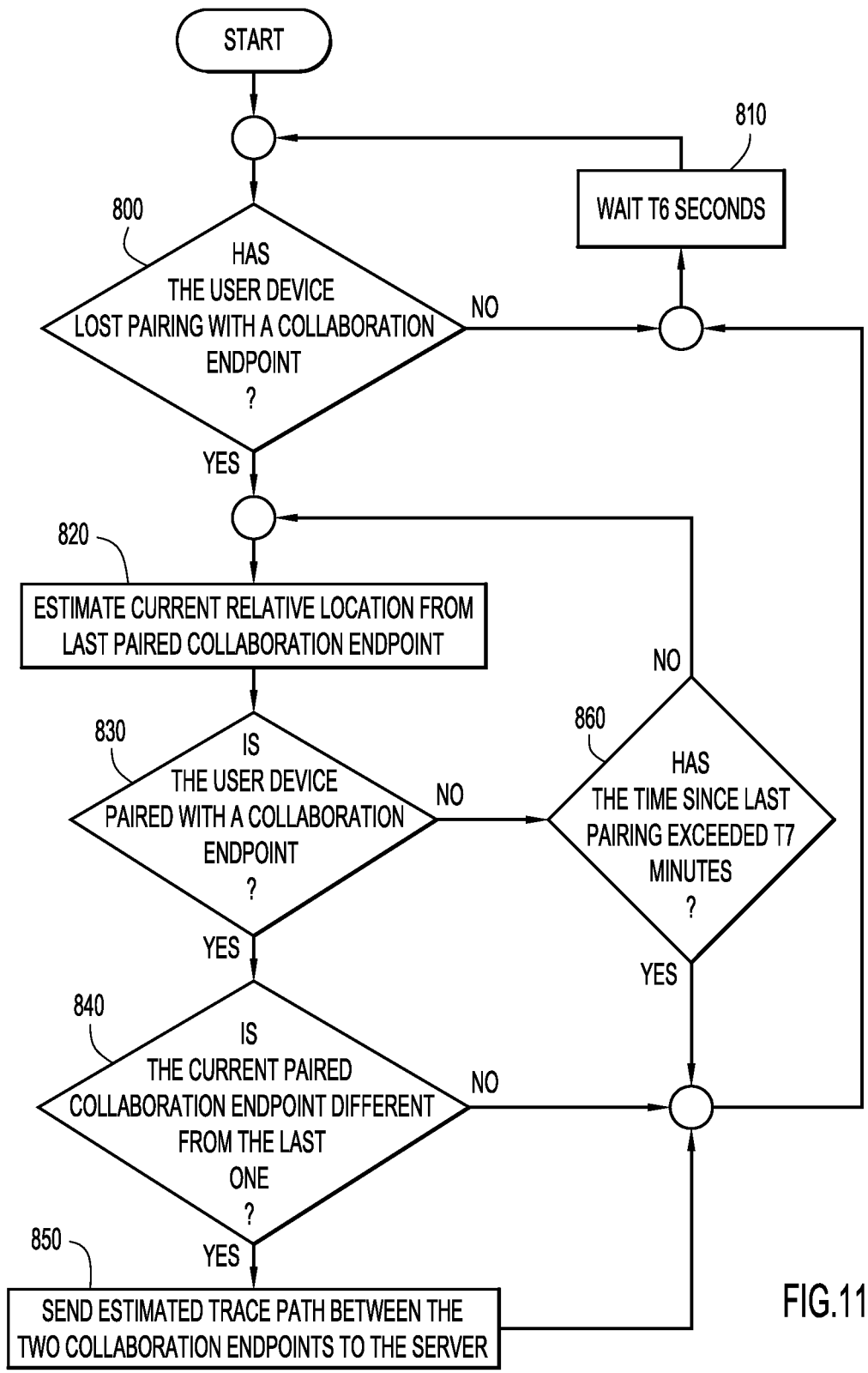
FIG. 11 is a flow diagram depicting in more detail operations performed by the user device within the building to determine the relative orientation of the collaboration endpoints within the building, according to an example embodiment.

Turning to FIG. 11, illustrated is a flow diagram that depicts, from the perspective of the user device 40(1)-40(4), the user device 40(1)-40(4) establishing and sending an estimated trace path between two collaboration endpoints to the server 60. In some buildings, GPS information may not have sufficient accuracy, or the server may not be able to acquire enough GPS readings to determine the relative orientations of the collaboration endpoints. Another way of determining the relative orientation of the collaboration endpoint is with dead reckoning techniques. Dead reckoning is the process of estimating a new location based on a known previous location and information from inertial sensors, such as the accelerometer 220 and compass 230 of the user devices. The accelerometer 220 and compass 230 may be used to continuously estimate the current location of the user device as it travels away from a collaboration endpoint. The next time the user device pairs with a collaboration endpoint, the server may be provided with a trace from one collaboration endpoint to the other collaboration endpoint. With sufficient traces, the server may be able to compute estimates of relative locations between collaboration endpoints in the building. Reference is also made to FIGS. 1-4 for purposes of the description of FIG. 11. At 800, the user device determines if it has lost its pairing with the collaboration endpoint. As previously explained, if the user device determines it is still paired with the collaboration endpoint, then at 810, the user device waits T6 seconds before returning to 800 to recheck if it has lost pairing with the collaboration endpoint. The value of T6 may be predetermined and may be equal to or different from the values for time periods of T1, T2, T3, T4, and T5, which were explained previously with reference to FIGS. 8, 9, and 10.

If the user device determines at 800 that it has lost its pairing with the collaboration endpoint, then, at 820, the user device estimates its current relative location in relation to the last paired collaboration endpoint. The user device may use the accelerometer 220 and compass 230 to determine the relative location in relation to the last paired collaboration endpoint. At 830, the user device then determines if it is paired with a collaboration endpoint. If the user device is now paired with a collaboration endpoint, then at 840, the user device determines if it is paired with a collaboration endpoint that is different from the collaboration endpoint the user device was previously paired with. If the user device determines it is paired with a different endpoint at 840, then at 850, the user device sends the estimated trace path between the two collaboration endpoints to the server. The server will then be able to determine the relative orientation of the second collaboration endpoint in relation to the previous collaboration endpoint. However, if the user device determines at 840 that the user device is paired with the same collaboration endpoint with which it was previously paired, the user device waits T6 seconds at 810 before then rechecking at 800 whether the user device has lost its pairing with the collaboration endpoint. In this scenario, the user device would have left a collaboration endpoint to then be repaired with the same collaboration endpoint. Thus, the user device did not travel to another collaboration endpoint, and the estimated trace path does not help the server determine the relative orientations of any of the collaboration endpoints.

If at 830, the user device has determined it is not yet paired with a collaboration endpoint, then at 860, the user device determines if the time since the user device has last been paired with a collaboration endpoint has exceeded T7 minutes, where the value of T7 may be equal to, greater than, or less than the value of the short time interval T, as explained previously with reference to FIG. 5. If the time has not exceeded T7 minutes, then the user device returns to 820, where it continues to estimate the current relative location in relation to the last paired collaboration endpoint. In this scenario, the user device is continuously recording its relative location from the last paired collaboration endpoint, so that eventually, when the user device is paired with a different collaboration endpoint, the user device, at 850, can send the estimated trace path to the server.

However, if, at 860, the user device determines that the time since it was last paired with a collaboration endpoint exceeds T7 minutes, the user device waits T6 seconds at 810 before then rechecking at 800 whether the user device has lost its pairing with the collaboration endpoint. In this scenario, because the time since the last pair has exceeded T7 minutes, the relative location data from the last collaboration endpoint is not longer accurate enough to be relied on to determine relative orientations between collaboration endpoints. Thus, the user device will begin the process over, once it has been paired with, and lost the pairing with, a collaboration endpoint.

Illustrated in FIGS. 12-18 are examples of tables that make up the approximate location map. Illustrated in FIG. 12 is an example table 900 of the collected air pressure readings from a building over a short time period of 5 minutes. Moreover, as previously indicated, the example air pressure readings table 900 may serve as a representation of the data of the air pressure database 120. As illustrated in the air pressure table 900, the first column indicates the time of the air pressure readings, the second column indicates the collaboration endpoint that the user device was paired with at the time of the air pressure reading, the third column indicates the user device that is providing the air pressure reading, and the fourth column indicates the provided air pressure reading. In the example illustrated, the first collected air pressure readings occurred at 12:44 and the final air pressure readings occurred at 12:49. Moreover, there were three user devices (A, B, C) that provided the air pressure readings. As illustrated in FIG. 12, the building contains as least four collaboration endpoints that are named "Edison," "Nerdsnest," "Tangram," and "Tott." It is from these air pressure readings that the server is able to calculate and populate the tables illustrated in FIGS. 13-16.

Figure 13:
FIG. 13 is a table depicting in more detail air pressure offsets for collaboration endpoints, according to an example embodiment.

Turning to FIG. 13, illustrated is an example table 910 of the collaboration endpoint offsets. As previously explained, the example collaboration endpoint offset table 910 may serve as a representation of the data of the endpoint offset database 140 of the server 60. In accordance with FIG. 5 and the explanation of the calculation of collaboration endpoint offsets, the offsets of the collaboration endpoints depicted in FIG. 13 are calculated from the air pressure readings depicted in FIG. 12. For example, the offset between collaboration endpoint "Edison" and collaboration endpoint "Nerdsnest" is calculated from the pressure reading at 12:44 of user device A paired with "Edison," and the pressure reading at 12:45 of user device A paired with "Nerdsnest." Because the same user device, user device A, is paired with "Edison" and then "Nerdsnest," the difference in the pressure readings can be used to determine the offset between "Edison" and "Nerdsnest." In another example, the calculation of the collaboration offsets between collaboration endpoint "Edison" and collaboration endpoint "Tangram" is calculated because of the readings provided by user device A. Because user device A gave the same pressure reading at 12:44 when paired with "Edison" as the pressure reading at 12:47 when paired with "Tangram," then the offset between "Edison" and "Tangram" is zero. Thus, "Edison" and "Tangram" are likely on the same floor level within the building.

Figure 14:
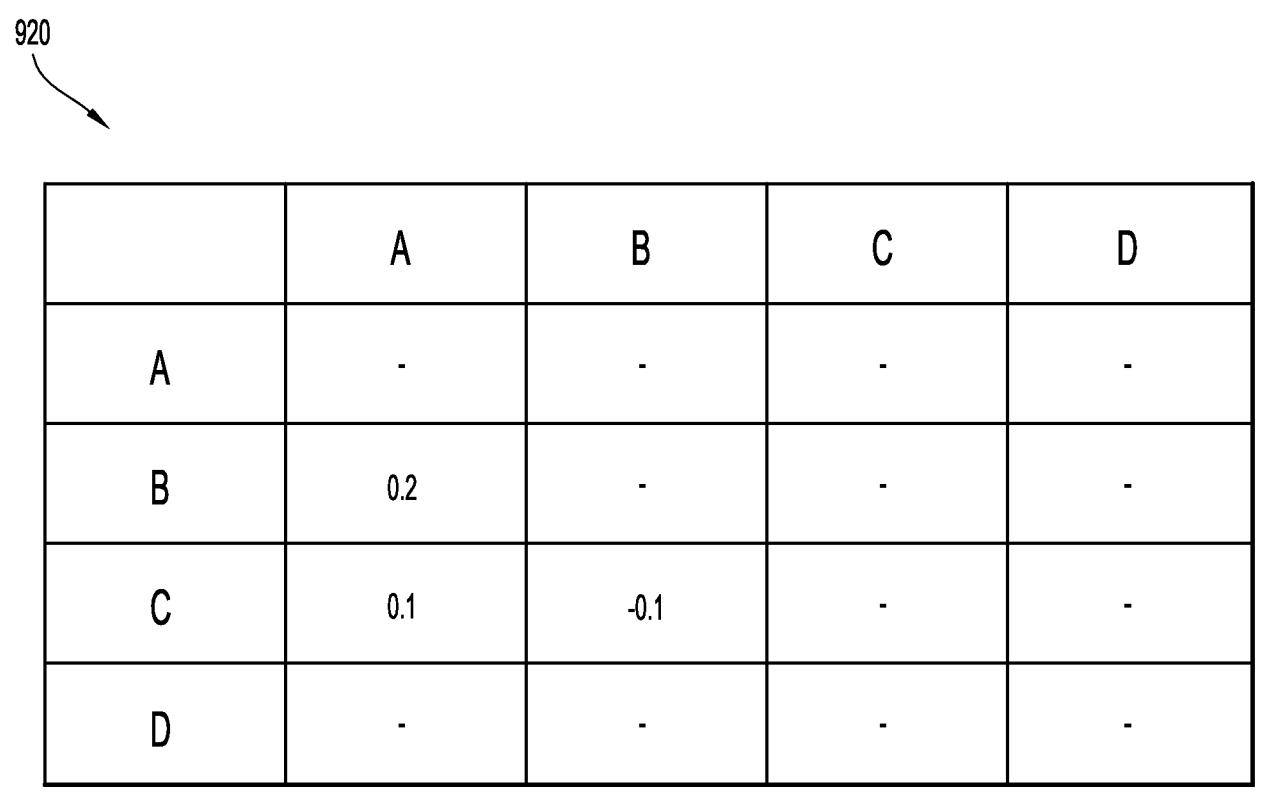

FIG. 14 illustrates an example table 920 of the user device offsets. As previously explained, the example user device offset table 920 may serve as a representation of the data of the device offset database 150 of the server 60. In accordance with FIG. 5 and the explanation of the calculation of user device offsets, the offsets of the user devices depicted in FIG. 14 are calculated from the air pressure readings depicted in FIG. 12. For example, the offset between user device A and user device B can be calculated from the pressure readings at 12:46 when the two user devices provided air pressure readings while being paired with the same collaboration endpoint "Nerdsnest." Because user devices A and B are paired with the same collaboration endpoint, we know that user device A and user device B are located in close proximity to one another and on the same floor as one another. The offset between user device A and user device B is the calculated by finding the difference between their provided air pressure readings at this time, which is 0.2. In another example, the offset between user device B and user device C can be determined once the offset between user devices A and B and the offset between user devices A and C have been established. The offset between user device A and user device C can be established because at 12:44, user device A provided an air pressure reading while paired with collaboration endpoint "Edison," and at 12:47, user device C provided an air pressure reading while paired with collaboration endpoint "Edison." Thus, the offset between user devices A and C is the difference between user device A's air pressure reading at 12:44 and user device C's air pressure reading at 12:47. Because the offset between user devices A and B has already been calculated, with the offset between user device A and C known, the offset between user device C and B can be calculated by factoring in the offset between user devices A and B. The offset between user device A and user device B is 0.2, while the user device offset between user device A and user device C is 0.1, so thus, subtracting the offset of user devices A and B from the offset of user devices A and C establishes that the offset between user devices B and C is −0.1.

Figure 15:
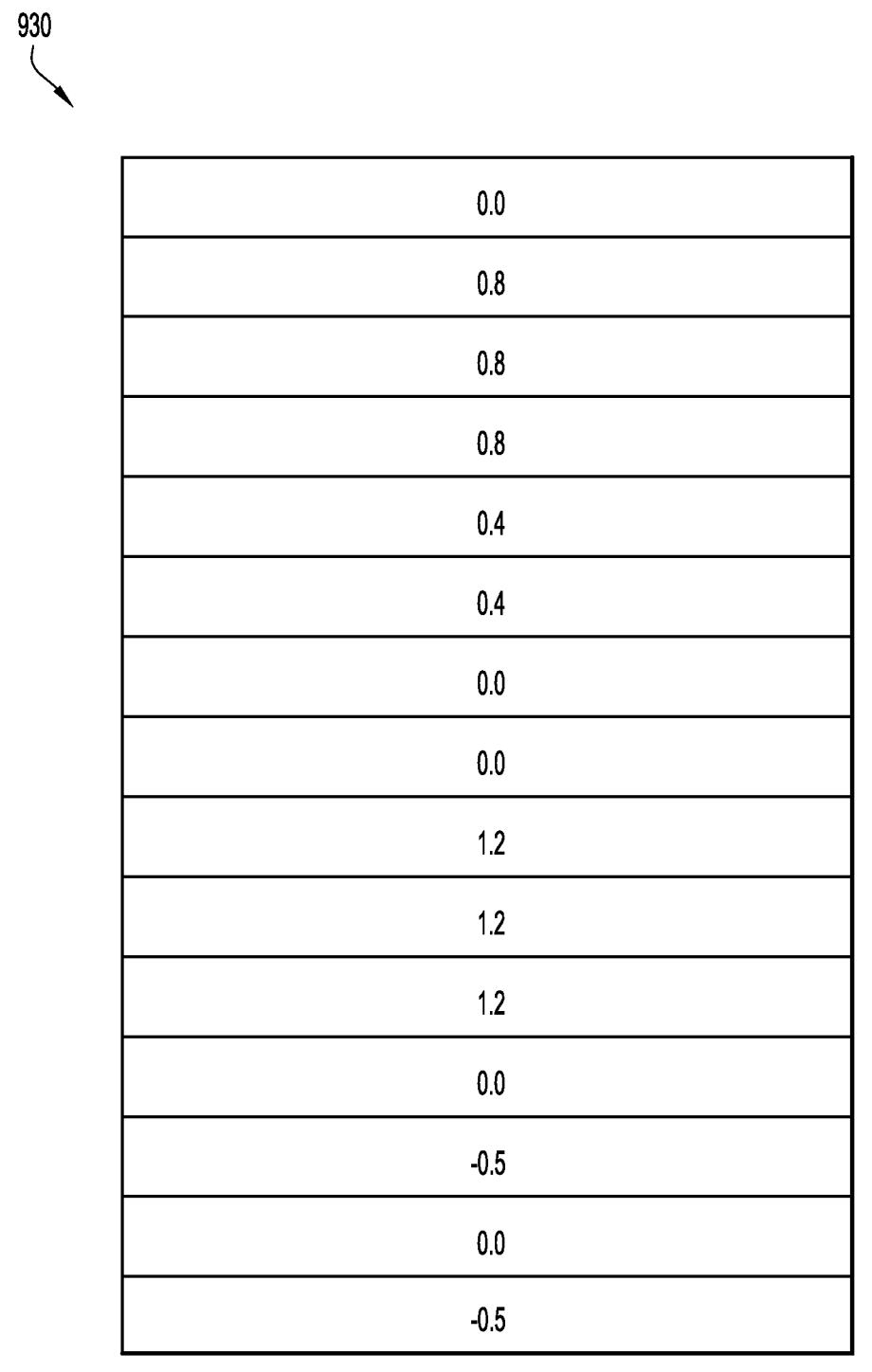

FIG. 15 illustrates an example table 930 that depicts the pressure differences to the reference floor. The example reference floor pressure differential table 930 may be updated in real time as the air pressure readings from the user devices A, B, and C are stored in the example air pressure readings table 900 illustrated in FIG. 12. As depicted in FIG. 12 and in the example air pressure readings table 900, at 12:44, user device A is paired with the collaboration endpoint "Edison" when it provides the first air pressure reading. Thus, the floor level of the collaboration endpoint "Edison" serves as the reference floor level. The first row in the example reference floor pressure differential table 930 contains the value 0.0 to represent the reference floor. Because at the time of the first readings from the user devices A, B, C the device offsets and collaboration endpoint offsets are not yet calculated, the reference floor pressure differentials for the readings at 12:44 of user devices B and C cannot yet be determined. However, at 12:45, user device A has been paired with collaboration endpoints "Edison" and "Nerdsnest" within the short time period of T minutes. The pressure difference between collaboration endpoint "Edison" and collaboration endpoint "Nerdsnest" is 0.8. Thus, the second row in the example reference floor pressure differentials table 930 contains the value of 0.8.

As illustrated in FIG. 12, at 12:46, both user device A and user device B are paired with Nerdsnest, so the user device offset between user device A and user device B can be computed, as explained previously with reference to FIG. 14. Furthermore, the relative pressure difference from user device A to the reference floor level is 0.8. Thus, the pressure difference from user device B at 12:46 to the reference floor level is also 0.8 when taking into account the relative device offset between user device A and user device B. In addition, because the user device offset between user device A and user device B is now known, the pressure differences to the reference floor from the two previous pressure readings from user device B, at 12:44 and at 12:45, can be calculated and stored in the example reference floor pressure differential table 930. Thus, row four of the example reference floor pressure differential table 930 represents the pressure difference between the reference floor and the user device B at 12:46. Furthermore, the value of 0.4 in row five represents the pressure difference between the reference floor and the user device B at 12:44, while the value of 0.4 in row six represents the pressure difference between the reference floor and the user device B at 12:45. The remainder of the values contained in the example reference floor pressure differential table 930 are calculated in a similar manner and with reference to the example air pressure table of FIG. 12.

FIG. 16 illustrates an example table 940 of the floor level offsets and the collaboration endpoints located on the floor levels. As previously explained, the example floor level offset table 940 may serve as a representation of the data of the floor level offset database 160 of the server 60. In accordance with FIG. 5 and the explanation of the calculation of floor level offsets, the offsets of the floor levels depicted in FIG. 16 are calculated from the air pressure readings depicted in FIG. 12, the collaboration endpoint offsets of FIG. 13, the user device offsets of FIG. 14, and the reference floor level pressure differentials of FIG. 15. Once all of the air pressure differentials from the reference floor level are calculated for the air pressure readings, the floor level offsets can be determined. Accurate estimation of the floor level offsets require the collection of a large amount of air pressure readings from the user devices, where the pressure differentials between user devices, compensated for the user device offsets, are stored in a long and continuously expanding table, such as that illustrated in FIG. 15. Once a sufficient number of pressure readings have been collected, the server 60 may calculate the floor level offsets. A large number of data points are needed to achieve an accurate estimate of floor level offsets and to exclude outlier air pressure readings coming from user devices located in between floor levels (i.e., such as in the stairways or in an elevator or escalator. As illustrated in FIG. 16, the first column of the example floor level offset table 940 contains the floor level reference names. Because only the floor level offset can be determined and not the actual floor level within the building, the floor levels are referred to as "Floor x," "Floor x+1," "Floor x+2," etc. Thus, the floor levels may only be expressed in the number of levels above or below the known floor levels are in relation to one another. Moreover, the second column of the example floor level offset table 940 contains the pressure difference to the floor level above. For example, the pressure difference from "Floor x" to "Floor x+1" is 0.5. Finally, the third column of the example floor level offset table 940 contains the collaboration endpoints in reference to the floor level in which the collaboration endpoint is located. Thus, collaboration endpoint "Tott" is located on "Floor x." Moreover, collaboration endpoints "Edison" and "Tangram" are located on "Floor x+1." Collaboration endpoint "Nerdsnest" is located on "Floor x+3," while floor levels "Floor x+2" and "Floor x+4" do not contain any collaboration endpoints.

FIGS. 17 and 18 illustrate examples of the data collected to determine the relative orientation of the collaboration endpoints within a building. As previously explained, the collaboration endpoints gather GPS information from the user devices that are paired with the collaboration endpoints. Thus, the server may compute the relative locations of the collaboration endpoints by averaging several GPS position readings over time and across different devices. Illustrated in FIG. 17 is an example of the server collecting multiple GPS readings to determine the relative orientation of the collaborations endpoints. One way the server may compute the relative orientation is to encapsulate all of the GPS readings that represent planar positions in the smallest possible circle. The server may then place a second circle having a smaller radius or diameter than the first circle within the first circle. The second circle is positioned within the first circle so that the two circles have the same center. The two concentric circles may then be split into four equally sized quadrants. The demarcation lines that split the concentric circles into four quadrants may be oriented along the cardinal directions (i.e., north, south, east, and west) of the building, such that each quadrant represents a section of the building oriented in the intermediate directions (i.e., northwest, northeast, southwest, southeast). In another embodiment, the concentric circles may be split into quadrants such that each quadrant represents a section of the building oriented in the cardinal directions.

As illustrated in FIG. 17, the demarcation lines represent the intermediate directions and the quadrants represent sectors of the building that are marked off based on the cardinal directions. Further illustrated in FIG. 17 is a series of GPS readings represented by a number within at least the outer circle. Each of the numbers represents a GPS reading measured by the GPS sensor 210 of a user device that is paired with a collaboration endpoint. Moreover, the numbers represent the collaboration endpoint that the user device was paired with at the time the GPS reading was taken. Thus, the number 1's represent the GPS readings of user devices paired with collaboration endpoint "Tott." The number 2's represent the GPS readings of user devices paired with collaboration endpoint "Edison," while the number 3's represent the GPS readings of user devices paired with collaboration endpoint "Tangram." Finally, the number 4's represent the GPS readings of user devices paired with collaboration endpoint "Nerdsnest." As illustrated in FIG. 17, collaboration endpoint "Tott" is most likely located in the central location of the building because the number 1's are located mostly within the smaller concentric circle. It then follows that, based on the location of the GPS measurements, collaboration endpoint "Edison" is most likely located in the south quadrant of the building, collaboration endpoint "Tangram" is most likely located in the north quadrant of the building, and collaboration endpoint "Nerdsnest" is located in the east quadrant of the building. These relative orientations of the collaboration endpoints are then stored in the example table illustrated in FIG. 18. The example relative orientation table illustrated in FIG. 18 may be stored in the GPS database 130 of the server, where the server may access the relative orientations of the collaboration endpoints in providing the directions to the meeting rooms to the user devices attending an upcoming meeting.

Turning to FIG. 19, illustrated is an example of a user device displaying the directions received from the server. While FIG. 19 illustrates only one example of a user device 40(1), it is to be understood that the configuration of FIG. 19 may be applied to the plurality of user devices 40(1)-40(4) previously described. As illustrated, the example of the user devices 40(1) may contain a display screen 970. As previously explained in reference to FIGS. 7 and 9, if the server 60 has stored all of the necessary information, measurements, and readings, then the server 60 may send a message to the user devices 40(1) that is scheduled to attend the meeting. The message may include the reference pressure reading along with its reference floor level, the known user device offset, and the age of the reference air pressure reading. The message may further contain the floor level and the orientation of the desired meeting room based on the collaboration endpoint located within the meeting room. Furthermore, the message may include a table of pressure differences between the floor levels. This information together with an air pressure reading from the user device 40(1) that is to receive the directions from the server 60 can be used to calculate the floor level of the user device 40(1) relative to the floor level of the desired meeting room. Once the user devices 40(1)-40(4) receives the information from the server, the user devices 40(1) may display the directions 980 on the display screen 970. As illustrated in FIG. 19, the displayed directions 980 include the name of the meeting ("CPOL meeting"), the name of the collaboration endpoint hosting the meeting ("Nerdsnest"), how many floors away and in what direction the collaboration endpoint is from the user device 40(1) ("three floors up"), and the direction within the building ("towards east"). In addition, as the user device 40(1) travels towards the collaboration endpoint the information displayed on the display screen 970 may be updated.

Figure 20:
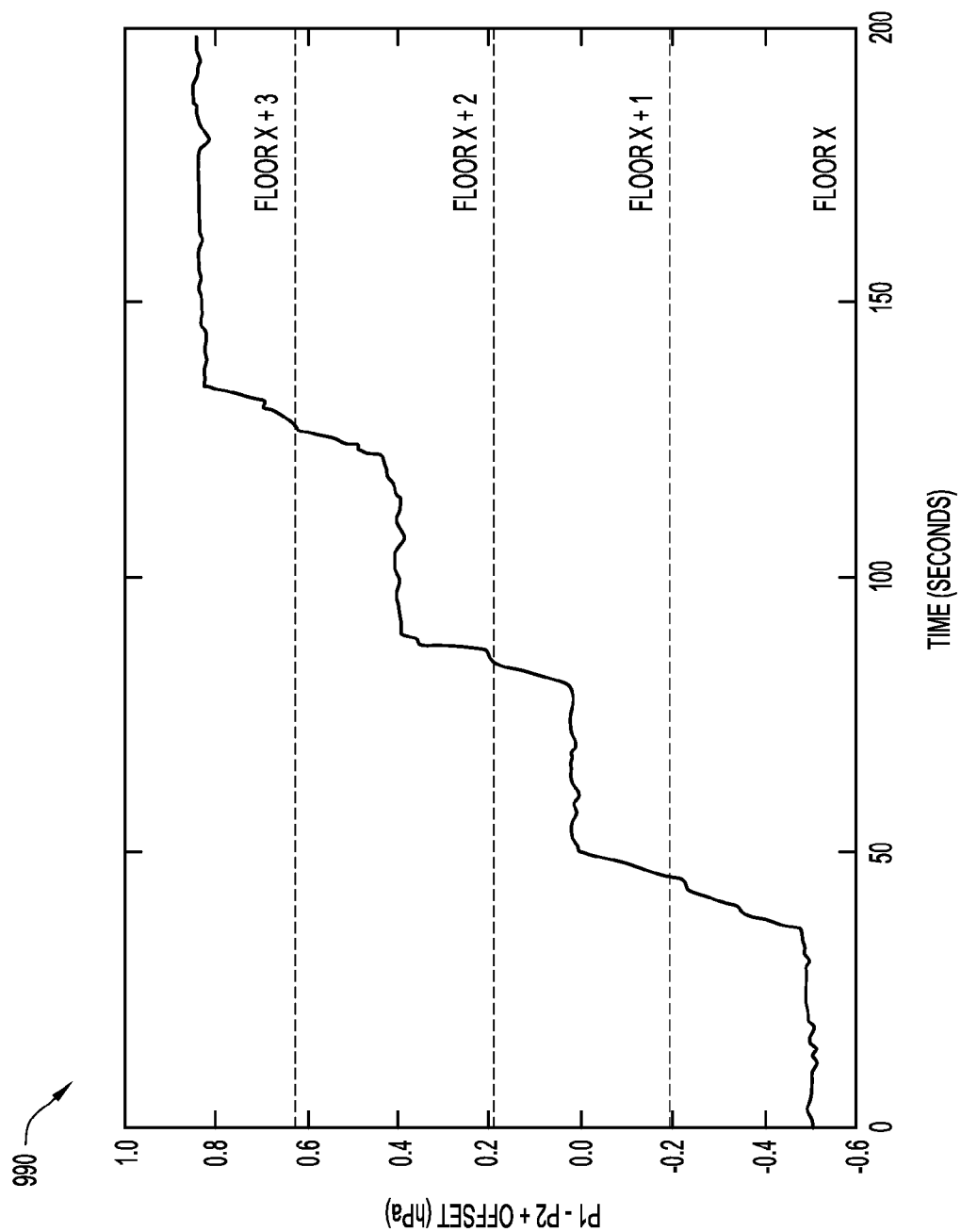
FIG. 20 is a chart depicting the pressure difference between two user devices compensated for their offset as a function of time, according to an example embodiment.

FIG. 20 illustrates a chart of the air pressure differentials between a first user device and a reference floor level over time, as the first user device travels towards the collaboration endpoint "Nerdsnest" located on "Floor x+3.". Thus, as depicted in the chart, the first user device was on the reference floor level, "Floor x+1," between approximately 50 seconds and 80 seconds. Moreover, as depicted in the chart of FIG. 20, the thresholds for changing floor levels, which may be obtained from the floor level offset database illustrated in FIG. 16, are shown as the horizontal dashed lines. Thus, the first user device ascends to the next floor level when the pressure differential between the user device and the reference floor level intersects the threshold lines. At the times the pressure differential line intersects the threshold lines, the display screen 970 of the user device may be updated with the number of floors that are left to ascend to reach the floor level of the collaboration endpoint "Nerdsnest."

Figure 21:
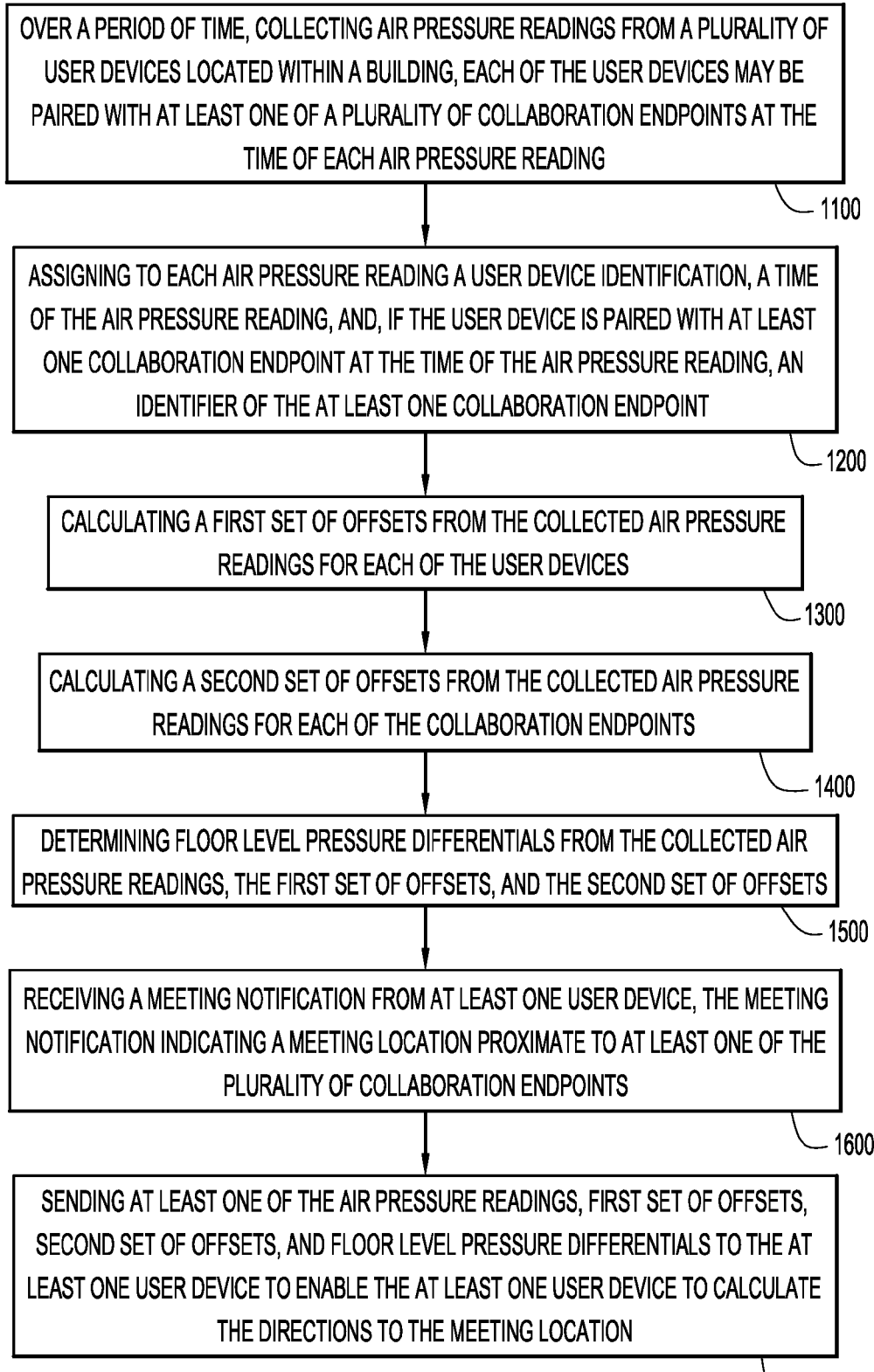
FIG. 21 is a flow chart depicting operations of the server illustrated in FIG. 1 to provide directions to a meeting location within a building, according to an example embodiment.

An example embodiment of a high-level process 1000 performed by the server 60 for determining directions to provide to a user device within a building of multiple collaboration endpoints is depicted in FIG. 21. Reference is also made to FIGS. 1-5 for purposes of the description of FIG. 21. At 1100, the server collects the air pressure readings from a plurality of user devices located within a building. Each of the user devices may be paired with at least one of a plurality of collaboration endpoints. As previously explained, a building may contain a plurality of floor levels with a number of user devices and collaboration endpoints located throughout the building on different floor levels. The user devices and the collaboration endpoints may contain proximity pairing technology that may allow them to be paired together once the user devices are in proximity to the collaboration endpoints. Moreover, the user devices may be equipped with air pressure sensors that provide a reading or a measurement of the air pressure at the location of the user device. At 1200, the server then assigns each air pressure reading a user device identification, the time of the air pressure reading, and, if paired with at least one collaboration endpoint at the time of the reading, the name of the at least one collaboration endpoint. The server then, at 1300 calculates a first set of offsets from the collected air pressure readings for each of the user devices. As previously explained, the offsets between user devices may be calculated when two or more user devices provide air pressure readings while all being paired with the same collaboration endpoint. At 1400, the server then calculates a second set of offsets from the collected air pressure readings for each of the collaboration endpoints. As previously explained, the collaboration endpoint offsets may be calculated when one user device provides an air pressure reading while paired with one collaboration endpoint and then provides a second air pressure reading when paired within another collaboration endpoint. Furthermore, at 1500, the server determines the floor level pressure differentials, or floor level offsets, from the collected air pressure readings, the first set of offsets, and the second set of offsets. The floor level offsets may provide the pressure differential between floor levels and may also specify what floor levels the collaboration endpoints are located. At 1600, the server receives a meeting notification from at least one user device, the meeting notification indicating a meeting location that is proximate to at least one of the plurality of collaboration endpoints. Moreover, at 1700, the server then sends at least one of the air pressure readings, the first set of offsets, the second set of offsets, and the floor level pressure differentials to the at least one user device. As explained previously, the user device may then calculate, from the information received from the server, the directions to the meeting location. The directions may include how many floor levels up or down the user device needs to travel within the building to arrive at the floor level of the meeting location.

The techniques presented herein provide a computer-implemented method of determining and sending directions to a meeting location within a building to a user device located within the same building. The computer-implemented method enables the server to automatically create and maintain an approximate location map of relative locations between collaboration endpoints within a building by combining proximity pairing technology with sensors available in user devices. Once created, the approximate location map can be used to increase the user experience for locating meeting rooms and collaboration endpoints within a building. The method does not require any manual setup, maintenance, or calibration. The method and system is fully automatic, and hence does not incur any additional cost to customers. Furthermore, extra hardware is not needed for the system and method to work within a building, other than a server and collaboration endpoints.

In another form, an apparatus is provided comprising a network interface unit configured to enable communications with a plurality of user devices; a memory; and a processor configured to: over a period of time, collect air pressure readings from the plurality of user devices located within a building, each of the user devices may be paired with at least one of the plurality of collaboration endpoints at the time of each air pressure reading, assign to each air pressure reading a user device identification, a time of the air pressure reading, and, if the user device is paired with at least one collaboration endpoint at the time of the air pressure reading, an identifier of the at least one collaboration endpoint, calculate a first set of offsets from the collected air pressure readings for each of the user devices, calculate a second set of offsets from the collected air pressure readings for each of the collaboration endpoints, determine floor level pressure differentials from the collected air pressure readings, the first set of offsets, and the second set of offsets, receive a meeting notification from at least one user device, the meeting notification indicating a meeting location proximate to at least one of the plurality of collaboration endpoints, and send at least one of the air pressure readings, first set of offsets, second set of offsets, and floor level pressure differentials to the at least one user device to enable the at least one user device to calculate the directions to the meeting location.

In still another form, presented herein is one or more non-transitory computer readable storage media of a server in communication with user devices, the computer readable storage media being encoded with software comprising computer executable instructions, and when the software is executed, operable to: over a period of time, collect air pressure readings from a plurality of user devices located within a building, each of the user devices may be paired with at least one of a plurality of collaboration endpoints at the time of each air pressure reading; assign to each air pressure reading a user device identification, a time of the air pressure reading, and, if the user device is paired with at least one collaboration endpoint at the time of the air pressure reading, an identifier of the at least one collaboration endpoint; calculate a first set of offsets from the collected air pressure readings for each of the user devices; calculate a second set of offsets from the collected air pressure readings for each of the collaboration endpoints; determine floor level pressure differentials from the collected air pressure readings, the first set of offsets, and the second set of offsets; receive a meeting notification from at least one user device, the meeting notification indicating a meeting location proximate to at least one of the plurality of collaboration endpoints; and send at least one of the air pressure readings, first set of offsets, second set of offsets, and floor level pressure differentials to the at least one user device to enable the at least one user device to calculate the directions to the meeting location.

The system and computer-implemented method may also provide other applications with the approximate location map. A collaboration endpoint (or a user device with known location) may determine, by accessing the databases of the server, the other collaboration endpoints within a certain distance or a certain amount of floor levels. This information could be used with scheduling or calendaring software to provide users with the next closest available meeting room. This is particularly useful when users want to extend a meeting beyond their initially booked time, but their current meeting room will not be available for much longer. Thus, the server may be configured to provide the user devices with notifications, such as, "This room is booked for another meeting in 5 minutes. The closest available meeting room is Edison (towards west on this floor), which is available until 11 am." In another example, when a user wants to book a meeting, the scheduling or calendaring software may automatically suggest a meeting room based on the location of the collaboration endpoints of the users attending the meeting.

The above description is intended by way of example only. Various modifications and structural changes may be made therein without departing from the scope of the concepts described herein and within the scope and range of equivalents of the claims.

What is claimed is:
1. A computer-implemented method comprising:
over a period of time, collecting air pressure readings from a plurality of user devices located within a building, each of the user devices may be paired with at least one of a plurality of collaboration endpoints at the time of each air pressure reading;
assigning to each air pressure reading a user device identification, a time of the air pressure reading, and, if the user device is paired with at least one collaboration endpoint at the time of the air pressure reading, an identifier of the at least one collaboration endpoint;
calculating a first set of offsets from the collected air pressure readings for each of the user devices;
calculating a second set of offsets from the collected air pressure readings for each of the collaboration endpoints;
determining floor level pressure differentials from the collected air pressure readings, the first set of offsets, and the second set of offsets;
receiving a meeting notification from at least one user device, the meeting notification indicating a meeting location proximate to at least one of the plurality of collaboration endpoints; and
sending at least one of the air pressure readings, first set of offsets, second set of offsets, and floor level pressure differentials to the at least one user device to enable the at least one user device to calculate the directions to the meeting location within the building.
2. The computer-implemented method of claim 1, further comprising:

collecting trace path information from the plurality of user devices within the building when the user devices unpair from the at least one of the plurality of collaboration endpoints.

3. The computer-implemented method of claim 1, wherein said collecting comprises collecting the air pressure readings from each of the plurality of user devices that include an air pressure sensor.

4. The computer-implemented method of claim 3, wherein said collecting the air pressure readings includes pairing the plurality of user devices with the at least one of the collaboration endpoints and providing the at least one of the collaboration endpoints with access to air pressure data from the air pressure sensor of each of the user devices.

5. The computer-implemented method of claim 1, further comprising:
collecting global positioning system (GPS) readings from the plurality of user devices located within the building, each of the user devices being paired with the at least one of the plurality of collaboration endpoints.

6. The computer-implemented method of claim 5, wherein said collecting the GPS readings includes pairing the plurality of user devices with a particular one of the plurality of collaboration endpoints and providing the particular collaboration endpoint with access to GPS data from a GPS sensor of the user device.

7. The computer-implemented method of claim 1, wherein the air pressure readings are valid for a predetermined time period.

8. An apparatus comprising:
a network interface unit configured to enable communications with a plurality of user devices;
a memory; and
a processor configured to:
over a period of time, collect air pressure readings from the plurality of user devices located within a building, each of the plurality of user devices may be paired with at least one of a plurality of collaboration endpoints at the time of each of said collected air pressure readings;
assign to each said air pressure reading a user device identification in the plurality of user devices, a time of the air pressure reading, and, if the user device is paired with the at least one collaboration endpoints at the time of the air pressure reading, an identifier of the at least one collaboration endpoint
calculate a first set of offsets from the collected air pressure readings for each of the user devices;
calculate a second set of offsets from the collected air pressure readings for each of the collaboration endpoints;
determine floor level pressure differentials from the collected air pressure readings, the first set of offsets, and the second set of offsets;
receive a meeting notification from at least one the plurality of user devices, the meeting notification indicating a meeting location proximate to at least one of the plurality of collaboration endpoints; and
send at least one of the air pressure readings, the first set of offsets, the second set of offsets, and the floor level pressure differentials to the at least one user device to enable the at least one user device to calculate directions to the meeting location within the building.

9. The apparatus of claim 8, wherein the processor is further configured to:

collect trace path information from the plurality of user devices within a building when the user devices unpair from at least one of the plurality of collaboration endpoints.

10. The apparatus of claim 8, wherein the processor is configured to collect the air pressuring readings from each of the plurality of user devices that includes an air pressure sensor.

11. The apparatus of claim 10, wherein the processor is configured to collect the air pressure readings from the plurality of user devices that are paired with at least one of the collaboration endpoints.

12. The apparatus of claim 8, wherein the processor is further configured to:
collect global positioning system (GPS) readings from the plurality of user devices located within a building, each of the user devices being paired with at least one of the plurality of collaboration endpoints.

13. The apparatus of claim 12, wherein the processor is configured to collect the GPS readings from the plurality of user devices that are paired with one of the plurality of collaboration endpoints.

14. The apparatus of claim 8, wherein the air pressure readings are valid for a predetermined time period.

15. One or more non-transitory computer readable storage media of a server in communication with user devices, the computer readable storage media being encoded with software comprising computer executable instructions, and when the software is executed, operable to:
over a period of time, collect air pressure readings from a plurality of user devices located within a building, each of the user devices may be paired with at least one of a plurality of collaboration endpoints at the time of each air pressure reading;
assign to each of the collected air pressure readings a user device identification of the plurality of user devices, a time of the air pressure reading, and, if the user device is paired with at least one collaboration endpoint at the time of the air pressure reading, an identifier of the at least one collaboration endpoint in the plurality of collaboration endpoints;
calculate a first set of offsets from the collected air pressure readings for each of the user devices;
calculate a second set of offsets from the collected air pressure readings for each of the plurality of collaboration endpoints;
determine floor level pressure differentials from the collected air pressure readings, the first set of offsets, and the second set of offsets;
receive a meeting notification from at least one of the user devices, the meeting notification indicating a meeting location proximate to at least one of the plurality of collaboration endpoints; and
send at least one of the air pressure readings, the first set of offsets, the second set of offsets, and the floor level pressure differentials to the at least one user device to enable the at least one user device to calculate directions to the meeting location within the building.

16. The computer readable storage media of claim 15, further comprising instructions operable to:
collect trace path information from the plurality of user devices within the building when the user devices unpair from at least one of the plurality of collaboration endpoints.

17. The computer readable storage media of claim 15, further comprising instructions operable to:

store the floor level pressure differentials in a floor level offset database that indicates an air pressure differential between each floor level of the building and the collaboration endpoints located on each floor level.

18. The computer readable storage media of claim 15, further comprising instructions operable to:
determine a reference air pressure reading from the collected air pressure readings of the plurality of user devices, wherein the directions are further calculated from the reference air pressure reading.

19. The computer readable storage media of claim 15, further comprising instructions operable to:
collect global positioning system (GPS) readings from the plurality of user devices located within the building, each of the user devices being paired with at least one of the plurality of collaboration endpoints.

20. The computer readable storage media of claim 19, further comprising instructions operable to:
store the GPS readings in a GPS database that indicates for each of the plurality of collaboration endpoints a relative orientation within the building.

\* \* \* \* \*